US011153110B2

(12) United States Patent
Li

(10) Patent No.: US 11,153,110 B2
(45) Date of Patent: Oct. 19, 2021

(54) COMMUNICATION METHOD AND TERMINAL IN LIVE WEBCAST CHANNEL AND STORAGE MEDIUM THEREOF

(71) Applicant: GUANGZHOU BAIGUOYUAN NETWORK TECHNOLOGY CO., LTD., Guangzhou (CN)

(72) Inventor: Nanbo Li, Guangzhou (CN)

(73) Assignee: BIGO TECHNOLOGY PTE. LTD., Singapore (SG)

(*) Notice: Subject to any disclaimer, the term of this patent is extended or adjusted under 35 U.S.C. 154(b) by 0 days.

(21) Appl. No.: 16/591,881

(22) Filed: Oct. 3, 2019

(65) Prior Publication Data
US 2020/0036545 A1 Jan. 30, 2020

Related U.S. Application Data

(63) Continuation of application No. PCT/CN2017/081891, filed on Apr. 25, 2017.

(30) Foreign Application Priority Data

Apr. 7, 2017 (CN) .......................... 201710223486.9

(51) Int. Cl.
H04L 12/18 (2006.01)
H04L 29/06 (2006.01)
H04R 5/04 (2006.01)

(52) U.S. Cl.
CPC ...... H04L 12/1822 (2013.01); H04L 12/1818 (2013.01); H04L 65/403 (2013.01); H04R 5/04 (2013.01)

(58) Field of Classification Search
CPC ............. H04N 21/4788; H04N 21/233; H04N 21/2393; H04N 21/4312; H04N 21/439;
(Continued)

(56) References Cited

U.S. PATENT DOCUMENTS

2002/0095679 A1  7/2002 Bonini
2015/0229514 A1  8/2015 Okuyama et al.
(Continued)

FOREIGN PATENT DOCUMENTS

CN  103533292 A  1/2014
CN  104104703 A  10/2014
(Continued)

OTHER PUBLICATIONS

WO 2016/082281 A1 and see US 2018/0167689 A1 that is English translation of this prior art reference (Year: 2016).*
(Continued)

Primary Examiner — June Y Sison
(74) Attorney, Agent, or Firm — Dilworth & Barrese, LLP.; Michael J. Musella, Esq.

(57) ABSTRACT

A communication method includes: acquiring first audio information when displaying a user interface of the live webcast channel; and transmitting the first audio information to a server over an audio path to the server, the server being configured to distribute the first audio information to at least one other client in the live webcast channel, the at least one other client being the streamer client, or the at least one other client being an audience client other than the audience client that transmits the first audio information, the audio path being established by a request to the server upon receipt of a trigger operation, the trigger operation being an operation acting on a target audio path control on the user interface of the live webcast channel.

12 Claims, 18 Drawing Sheets

(58) Field of Classification Search
CPC ............ H04L 12/1818; H04L 12/1822; H04L 65/1069; H04L 65/403; H04L 65/4076; H04L 65/601; H04L 65/608; H04R 5/04
See application file for complete search history.

(56) References Cited

U.S. PATENT DOCUMENTS

| | | | |
|---|---|---|---|
| 2015/0296247 A1 | 10/2015 | Glasser | |
| 2016/0055851 A1 | 2/2016 | Charugundla | |
| 2016/0073056 A1* | 3/2016 | Katzman | H04N 7/15 348/14.07 |
| 2016/0239165 A1 | 8/2016 | Chen et al. | |
| 2017/0142489 A1 | 5/2017 | Deweese et al. | |
| 2017/0318161 A1* | 11/2017 | Zhou | H04M 9/082 |
| 2018/0167689 A1* | 6/2018 | Qin | H04N 21/47202 |
| 2018/0332423 A1* | 11/2018 | Edry | H04S 7/303 |
| 2019/0124400 A1* | 4/2019 | Wang | H04N 21/472 |
| 2019/0221209 A1* | 7/2019 | Bulpin | G10L 15/08 |
| 2020/0107079 A1* | 4/2020 | Sun | H04N 21/8133 |
| 2020/0186893 A1* | 6/2020 | Sanchez | H04N 21/466 |

FOREIGN PATENT DOCUMENTS

| | | |
|---|---|---|
| CN | 104166547 A | 11/2014 |
| CN | 104168517 A | 11/2014 |
| CN | 104394432 A | 3/2015 |
| CN | 105100080 A | 11/2015 |
| CN | 105530535 A | 4/2016 |
| CN | 105828214 A | 8/2016 |
| CN | 105898609 A | 8/2016 |
| CN | 106341695 A | 1/2017 |
| JP | 2002524935 A | 8/2002 |
| JP | 2009201005 A | 9/2009 |
| JP | 2015149686 A | 8/2015 |
| JP | 2018508133 A | 3/2018 |
| WO | 2016133796 A1 | 8/2016 |

OTHER PUBLICATIONS

International Search Report of PCT Application No. PCT/CN2017/081891 dated Dec. 22, 2017.
First Office Action of Chinese application No. 201710223486.9 dated Mar. 4, 2019.
Second Office Action of Chinese application No. 201710223486.9 dated Aug. 5, 2019.
Third Office Action of Chinese application No. 201710223486.9 dated Dec. 27, 2019.
Fengqiang Zhang, Construction of Remote Video Live Broadcasting, Interactive Education and Teaching System in Regional Education Network; Digital Technology and Application; Sep. 15, 2016; pp. 162-163, with English translation of the Abstract.
Japanese search report of Japanese application No. 2020-504755 dated Feb. 1, 2021.
Notice of reasons for refusal of Japanese application No. 2020-504755 dated Mar. 22, 2021.
Akutsu Free (interactive simulation programs using the and 3 others), Sim TV3 IInteractive simulation program using the Internet, Feb. 1, 1996; vol. 49, No. 2, pp. 143 to 148.
Akihiro Nakao, et al; Constructing End-to-End Paths for Playing Media Objects, 2001 IEEE Open Architectures and Network Programming; Aug. 2002, entire document.

* cited by examiner

COMMUNICATION METHOD AND TERMINAL IN LIVE WEBCAST CHANNEL AND STORAGE MEDIUM THEREOF

CROSS-REFERENCE TO RELATED APPLICATION

This application is a Continuation of International Application No. PCT/CN2017/081891, filed on Apr. 25, 2017, which claims priority to Chinese Patent Application No. 201710223486.9, filed on Apr. 7, 2017 and entitled "COMMUNICATION METHOD, APPARATUS AND SYSTEM IN LIVE WEBCAST CHANNEL", which is hereby incorporated by reference in its entirety.

TECHNICAL FIELD

Embodiments of the present disclosure relate to the field of network live webcast, and in particular, relate to a communication method and apparatus in a live webcast channel, and a storage medium thereof.

BACKGROUND

A network live webcast system is an Internet system which broadcasts a multimedia stream from a streamer client to a plurality of audience clients. The network living webcast system is generally classified according to channels (may also be referred to as rooms or live webcast studios). Each live webcast channel includes a streamer and audiences.

SUMMARY

Examples of the present disclosure provide of the present invention provide a communication method and apparatus in a live webcast channel, and a storage medium thereof. The technical solutions are as follows.

In a first aspect, a communication method in a live webcast channel is provided. The method includes:

acquiring first audio information when displaying a user interface of the live webcast channel; and transmitting the first audio information to the server over an audio path to the server, the server being configured to distribute the first audio information to at least one other client within the live webcast channel, wherein the at least one other client is the streamer client, or the at least one other client is an audience client other than the audience client that transmits the first audio information, and the audio path is established by a request to the server according to a trigger operation, the trigger operation being an operation acting on a target audio path control on the user interface of the live webcast channel.

In some embodiments, prior to the acquiring first audio information when displaying a user interface of the live webcast channel, the method further includes:

displaying at least one audio path control on the user interface;

receiving the trigger operation acting on the target audio path control, the trigger operation being to trigger an operation of sending a path establishment request to the server; the path establishment request being to establish an audio path corresponding to the target audio path control; the target audio path control being one of the at least one audio path control.

In some embodiments, the acquiring first audio information when displaying a user interface of the live webcast channel includes:

after the audio path is successfully established, acquiring the first audio information when displaying a user interface of the live webcast channel.

In some embodiments, the displaying at least one audio path control includes:

on the user interface of the live webcast channel, displaying a first audio path control in a first display mode, a first audio path corresponding to the first audio path control being in an establishment prohibited state; and displaying a second audio path control in a second display mode, a second audio path corresponding to the second audio path control being in an establishment permitted state;

or, on the user interface of the live webcast channel, not displaying the first audio path control, and displaying the second audio path control in a second display mode;

wherein the first display mode is different from the second display mode.

In some embodiments, after the receiving a trigger operation acting on a target audio path control, the method further includes:

on the user interface of the live webcast channel, displaying the target audio path control in a third display mode, the third display mode being to indicate that an audio path corresponding to the target audio path control is occupied.

In some embodiments, the third display mode includes: replacing a default icon on the target audio path control with an avatar icon corresponding to an audience identifier that logs in the audience client.

In some embodiments, after the displaying, on the user interface of the live webcast channel, the target audio path control in a third display mode, the method further includes:

receiving a disconnect operation, the disconnect operation being to disconnect an audio path corresponding to the target audio path control; and displaying the target audio path control in a second display mode, the second display mode being to indicate that the audio path corresponding to the target audio path control is in an establishment permitted state.

In some embodiments, the acquiring first audio information when displaying a user interface of the live webcast channel includes:

receiving an audio capture operation; and starting to capture the first audio information according to the audio capture operation.

In some embodiments, after the starting to capture the first audio information according to the audio capture operation, the method further includes:

receiving a capture stop operation; and stopping capturing the first audio information according to the capture stop operation.

In some embodiments, the method further includes:

on the user interface of the live webcast channel, displaying a fourth audio path control in a fourth display mode, the fourth display mode being to indicate that audio information is being transmitted on an audio path corresponding to the fourth audio path control, and the fourth audio path control being an audio path control in the at least one audio path control.

In some embodiments, the acquiring the first audio information when displaying a user interface of the live webcast channel includes:

capturing an audio signal according to the received audio capture operation after the audio path is successfully established;

comparing the audio signal with second audio information transmitted by the server, the second audio information being audio information received from the server and played in real-time by the audience client; and removing, by an echo cancellation algorithm and from the audio signal, information the same as the second audio information to obtain the first audio information.

In some embodiments, the method further includes:

when the audience client runs in the back-end, prohibiting acquiring the live video stream from the server.

In a second aspect, a communication method in a live webcast channel is provided. The method is implemented by a server, and the live webcast channel includes a streamer identifier and an audience identifier, wherein a streamer client corresponding to streamer identifier is configured to provide a live video stream corresponding to the live webcast channel; an audience client corresponding to the audience identifier is configured to play the live video stream. The method includes:

receiving first audio information over an audio path to the audience client; the audio path is established by a request to the server according to a trigger operation; the trigger operation is an operation acting on a target audio path control on the user interface of the live webcast channel; and distributing the first audio information to at least one other client pertaining to the live webcast channel; the at least one other client being the streamer client, or the at least one other client being a client other than the audience client that transmits the first audio information.

wherein a communication set corresponding to the live webcast channel comprises a streamer identifier and an audience identifier, and a streamer client corresponding to the streamer identifier is configured to provide a live video stream corresponding to the live webcast channel.

In some embodiments, prior to acquiring the first audio information when displaying the user interface of the live webcast channel, the method further includes:

receiving the path establishment request transmitted by an audience client, the path establishment request being generated by the audience client according to a received trigger operation acting on the target audio path control; the target audio path control being one of the at least one audio path control displayed on the user interface;

establishing an audio path to the audience client according to the path establishment request.

In some embodiments, the path establishment request at least includes a path identifier corresponding to the target audio path control, a live webcast channel identifier corresponding to the live webcast channel and an audience identifier corresponding to the audience client; and the establishing an audio path to the audience client according to the path establishment request includes:

transmitting the path establishment request to a management client pertaining to the live webcast channel corresponding to the live webcast channel identifier, the management client referring to a client with management authority in the live webcast channel;

receiving the path establishment instruction transmitted by the management client; the path establishment request being a request transmitted by the management client for establishing the audio path when the management client permits to establish the audio path; and establishing the audio path to the audience client according to the path establishment instruction.

In some embodiments, the method further includes:

receiving a channel disabled state notification, the channel disabled state notification including a path identifier of at least one audio path and a live webcast channel identifier, and the channel disabled state notification being to notify the server that, in the live webcast channel corresponding to the live webcast channel identifier, a first audio path corresponding to the path identifier is in an establishment prohibited state; and transmitting the channel disabled state notification to the audience client.

In some embodiments, after the transmitting the channel disabled state notification to the audience client, the method further includes:

receiving a disabled state release notification, the disabled state release notification including a path identifier of the first audio path and the live webcast channel identifier, and the disabled state release notification being to notify the server that, in the live webcast channel corresponding to the live webcast channel identifier, the first audio path is in an establishment permitted state; and transmitting the disabled state release notification to the audience client.

In a third aspect, a communication method in a live webcast channel. The method is implemented by a management client installed in a terminal, and the live webcast channel includes a streamer identifier and an audience identifier, wherein a streamer client corresponding to the streamer identifier is configured to provide live video stream corresponding to the live webcast channel, and an audience client corresponding to the audience identifier is configured to play the live video stream. The method includes:

displaying, on a user interface of a live webcast channel, a path establishment request transmitted by a server, the path establishment request including an audience identifier pertaining to the live webcast channel, and the path establishment request being to request to establish an audio path between an audience client corresponding to the audience identifier and the server;

transmitting a path establishment instruction to the server according to the path establishment request, the path establishment instruction being to instruct the server to establish the audio path; the audio path being a path for transmitting first audio information to a server by an audience client corresponding to the audience identifier, the server being configured to distribute the first audio information to at least one other client pertaining to the live webcast channel, the at least one other client being the streamer client, or the at least one other client being a client other than the audience client that transmits the first audio information.

In some embodiments, the method further includes:

receiving the first audio information transmitted by the server.

In some embodiments, the method further includes:

displaying at least one audio path control on the user interface of the live webcast channel, the audio path control being configured to trigger the establishment of an audio path between the management client and the server.

In some embodiments, the displaying at least one audio path control on the user interface of the live webcast channel includes:

on the user interface of the live webcast channel, displaying a first audio path control in a first display mode; or, on the user interface of the live webcast channel, not displaying the first audio path control, an audio path corresponding to the first audio path control being in an establishment prohibited state;

and/or, on the user interface of the live webcast channel, displaying a second audio path control in a second display mode, an audio path corresponding to the second audio path control being in an establishment permitted state;

and/or, on the user interface of the live webcast channel, displaying a third audio path control in a third display mode, the third display mode being to indicate that an audio path corresponding to the third audio path control is occupied;

and/or, on the user interface of the live webcast channel, displaying a fourth audio path control in a fourth display mode, the fourth display mode being to indicate that audio information is being transmitted on an audio path corresponding to the fourth audio path control.

In some embodiments, the method further includes:

receiving a first channel setting operation;

generating a channel disabled state notification according to a path identifier corresponding to a first audio path and a live webcast channel identifier corresponding to the live webcast channel indicated by the first channel setting operation; and transmitting the channel disabled state notification to the server, and determining, by the server and according to the channel disabled state notification, the first audio path in the live webcast channel to be in an establishment prohibited state.

In some embodiments, after the transmitting the channel disabled state notification to the server, the method further includes:

receiving a second channel setting operation;

generating a disabled state release notification according to the path identifier corresponding to the first audio path and the live webcast channel identifier corresponding to the live webcast channel indicated by the second channel setting operation; and transmitting the disabled state release notification to the server, and determining, by the server and according to the disabled state release state, the first audio path in the live webcast channel to be in an establishment permitted state.

In a fourth aspect, a communication apparatus in a live webcast channel is provided. The apparatus is applied in an audience client installed in a terminal, and the live webcast channel includes a streamer identifier and an audience identifier, wherein a streamer client corresponding to the streamer identifier is configured to provide a live video stream corresponding to the live webcast channel, and an audience client corresponding to the audience identifier is configured to play the live video stream. The apparatus includes:

an acquiring module, configured to acquire first audio information when displaying a user interface of the live webcast channel; and a transmitting module, configured to transmit the first audio information to the server over the audio path to the server, the least one other client being the streamer client, or the at least one other client being a client other than the audience client that transmits the first audio information, the audio path being established by a request to the server according to a received trigger operation, the trigger operation being an operation acting on a target audio path control on the user interface of the live webcast channel.

In some embodiments, the apparatus further includes:

a first displaying module, configured to display, prior to the obtaining model acquires first audio information when displaying a user interface of the live webcast channel, at least one audio path control on a user interface of a live webcast channel; and a first receiving module, configured to receive a trigger operation acting on a target audio path control, the trigger operation being to trigger sending a path establishment request to the server, the path establishment request being to establish an audio path corresponding to the target audio path control the target audio path control being one of the at least one audio path control;

wherein the acquiring module is configured to acquire first audio information when displaying a user interface of the live webcast channel.

In some embodiments, the first displaying module includes:

a first displaying unit, configured to, on the user interface of the live webcast channel, display a first audio path control in a first display mode, a first audio path corresponding to the first audio path control being in an establishment prohibited state; and display a second audio path control in a second display mode, a second audio path corresponding to the second audio path control being in an establishment permitted state; and a second displaying unit, configured to, on the user interface of the live webcast channel, not display the first audio path control; and display the second audio path control in a second display mode;

wherein the first display mode is different from the second display mode.

In some embodiments, the apparatus further includes:

a second displaying module, configured to display, on the user interface of the live webcast channel, the target audio path control in a third display mode, the third display mode being to indicate that an audio path corresponding to the target audio path control is occupied.

In some embodiments, the apparatus further includes:

a second receiving module, configured to receive a disconnect operation, the disconnect operation being to disconnect an audio path corresponding to the target audio path control; and a third displaying module, configured to display the target audio channel control in a second display mode, the second display mode being to indicate that the audio path corresponding to the target audio path control is in an establishment permitted state.

In some embodiments, the acquiring module includes:

a receiving unit, configured to receive an audio capture operation; and a first capturing unit, configured to start to capture the first audio information according to the audio capture operation.

In some embodiments, the apparatus further includes:

a third receiving module, configured to receive a capture stop operation; and a capture stopping module, configured to stop capturing the first audio information according to the capture stop operation.

In some embodiments, the apparatus further includes:

a fourth displaying module, configured to display, on the user interface of the live webcast channel, a fourth audio path control in a fourth display mode, the fourth display mode being to indicate that audio information is being transmitted on an audio path corresponding to the fourth audio path control, the fourth audio path control being an audio path control in the at least one audio path control.

In some embodiments, the obtaining module includes:

a second capturing unit, configured to capture an audio signal according to the received audio capture operation;

a comparing unit, configured to compare the audio signal with second audio information transmitted by the server, the second audio information is audio information received from the server and played in real-time by the audience client;

an echo canceling unit, configured to remove, by an echo cancellation algorithm and from the audio signal, the same information as the second audio information to obtain the first audio information.

In some embodiments, the apparatus further includes:

a capture prohibiting module, configured to prohibit capturing the live video stream from the server when the audience client runs in the background.

In a fifth aspect, a communication apparatus in a live webcast channel is provided. The apparatus is applied in a server, and the live webcast channel includes a streamer identifier and an audience identifier, wherein a streamer client corresponding to the streamer identifier is configured to provide live video stream corresponding to the live webcast channel, and an audience client corresponding to the audience identifier is configured to play the live video stream. The apparatus includes:

an information receiving module, configured to receive first audio information over an audio path to the audience client, the audio path being established by a request to the server according to a trigger operation; the trigger operation being an operation acting on a target audio path control on the user interface of the live webcast channel; and an information transmitting module, configured to distribute the first audio information to at least one other client pertaining to the live webcast channel; the at least one other client being the streamer client, or the at least one other client being a client other than the audience client that transmits the first audio information.

In some embodiments, the apparatus further includes:

a request receiving module, configured to receive, prior to the obtaining model acquires first audio information when displaying a user interface of the live webcast channel, a path establishment request transmitted by an audience client, the path establishment request being generated by the audience client when receiving a trigger operation acting on a target audio path control, the target audio path control being one of at least one audio path control displayed on a user interface of a live webcast channel:

a channel establishment module, configured to establish an audio path to the audience client according to the path establishment request;

In some embodiments, the path establishment request at least includes a path identifier corresponding to the target audio path control, a live webcast channel identifier corresponding to the live webcast channel and an audience identifier corresponding to the audience client.

The channel establishment module includes:

a request transmitting unit, configured to transmit the path establishment request to a management client pertaining to the live webcast channel corresponding to the live webcast channel identifier, the management client being a client with management authority in the live webcast channel;

an instruction receiving unit, configured to receive the path establishment instruction transmitted by the management client; the path establishment request being a request transmitted when determining, by the management client, the establishment for an audio path corresponding to the path identifier being permitted; and a channel establishing unit, configured to establish the audio path to the audience client according to the path establishment instruction.

In some embodiments, the apparatus further includes:

a first receiving module, configured to receive a channel disabled state notification, the channel disabled state notification including a path identifier of at least one audio path and a live webcast channel identifier, the channel disabled state notification being to notify the server that, in the live webcast channel corresponding to the live webcast channel identifier, a first audio path corresponding to the path identifier is in an establishment prohibited state; and a first transmitting module, configured to transmit the channel disabled state notification to the audience client.

In some embodiments, the apparatus further includes:

a second receiving module, configured to receive a disabled state release notification, the disable state release notification including the path identifier of the first audio path and the live webcast channel identifier, the disabled state release notification being to notify the server that, in the live webcast channel corresponding to the live webcast channel identifier, the first audio path in an establishment permitted state; and a second transmitting module, configured to transmit the disabled state release notification to the audience client.

In a sixth aspect, a communication apparatus in a live webcast channel is provided. The apparatus is applied in a management client installed in a terminal, and the live webcast channel includes a streamer identifier and an audience identifier, wherein a streamer client corresponding to streamer identifier is configured to provide live video stream corresponding to the live webcast channel, and an audience client corresponding to the audience identifier is configured to play the live video stream. The apparatus includes:

a request displaying module, configured to display, on a user interface of the live webcast channel, a path establishment request transmitted by a server, the path establishment request including the audience identifier pertaining to the live webcast channel, the path establishment request being to establish the audio path between the audience terminal corresponding to the audience identifier and the server; and an instruction transmitting module, configured to transmit a path establishment instruction to the server according to the path establishment request, the path establishment instruction being to instruct the server to establish the audio path, the path establishment instruction being to instruct the server to establish the audio path, the audio path being a path for transmitting first audio information to a server by an audience client corresponding to the audience identifier, the server being configured to distribute the first audio information to at least one other client pertaining to the live webcast channel, the at least one other client being the streamer client, or the at least one other client being a client other than the audience client that transmits the first audio information.

In some embodiments, the apparatus further includes:

an information receiving module, configured to receive first audio information transmitted by the server.

In some embodiments, the apparatus further includes:

a displaying module, configured to display at least one audio path control on the user interface of the live webcast channel, the audio path control being configured to trigger the establishment of an audio path between the management client and the server.

In some embodiments, the displaying module includes:

a first displaying unit, configured to display, on the user interface of the live webcast channel, a first audio path control in a first display mode; or not display the first audio path control on the user interface of the live webcast channel, an audio path corresponding to the first audio path control being in an establishment prohibited state;

a second displaying unit, configured to display, on the user interface of the live webcast channel, a second audio path control in a second display mode, an audio path corresponding to the second audio path control being in an establishment permitted state;

a third displaying unit, configured to display, on the user interface of the live webcast channel, a third audio path control in a third display mode, the third display mode being to indicate that an audio path corresponding to the third audio path control is occupied; and a fourth displaying unit, configured to display, on the user interface of the live webcast channel, a fourth audio path control in a fourth display mode, the fourth display mode being to indicate that audio information is being transmitted on an audio path corresponding to the fourth audio path control.

In some embodiments, the apparatus further includes:

a first receiving module, configured to receive a first channel setting operation;

a first generating module, configured to generate a channel disabled state notification according to a path identifier corresponding to a first audio path and a live webcast channel identifier corresponding to the live webcast channel indicated by the first channel setting operation:

a first transmitting module, configured to transmit the channel disabled state notification to the server, the server determining, according to the channel disabled state notification, the first audio path in the live webcast channel to be in an establishment prohibited state.

In some embodiments, the apparatus further includes:

a second receiving module, configured to receive a second channel setting operation;

a second generating module, configured to generate a disabled state release notification according to the path identifier corresponding to the first audio path and the live webcast channel identifier corresponding to the live webcast channel indicated by the second channel setting operation; and a second transmitting module, configured to transmit the disabled state release notification to the server, the server determining, according to the disabled state release notification, the first audio path in the live webcast channel to be in an establishment permitted state.

In a seventh aspect, a communication system in a live webcast channel is provided. The system includes an audience client and a management client; wherein the audience client is the apparatus according to the fourth aspect;

the server is the apparatus according to the fifth aspect; and the management client is the apparatus according to the sixth aspect.

In an eighth aspect, a non-transitory computer-readable storage medium is provided. The non-transitory computer-readable storage medium stores one or more instructions, wherein the one or more instructions, when being executed by a processor, cause the processor to perform the communication method in a live webcast channel according to the first aspect.

In a ninth aspect, a non-transitory computer-readable storage medium is provided. The non-transitory computer-readable storage medium stores one or more instructions, wherein the one or more instructions, when being executed by a processor, cause the processor to perform the communication method in a live webcast channel according to the second aspect.

In a tenth aspect, a non-transitory computer-readable storage medium is provided. The non-transitory computer-readable storage medium stores one or more instructions, wherein the one or more instructions, when being executed by a processor, cause the processor to perform the communication method in a live webcast channel according to the third aspect.

In an eleventh aspect, a terminal is provided. The terminal includes a processor and a memory. The memory stores one or more instructions, wherein the one or more instructions, when being executed by a processor to perform the communication method in a live webcast channel according to the first aspect.

In a twelfth aspect, a terminal is provided. The terminal includes a processor and a memory. The memory stores one or more instructions, wherein the one or more instructions, when being executed by a processor to perform the communication method in a live webcast channel according to the second aspect.

In a thirteenth aspect, a terminal is provided. The terminal includes a processor and a memory. The memory stores one or more instructions, wherein the one or more instructions, when being executed by a processor to perform the communication method in a live webcast channel according to the third aspect.

BRIEF DESCRIPTION OF THE DRAWINGS

For clearer descriptions of the technical solutions in the embodiments of the present disclosure, the accompanying drawings to be used in the descriptions of the embodiments are briefly described hereinafter. Apparently, the accompanying drawings in the following descriptions are some embodiments of the present disclosure, and other accompanying drawings may be obtained according to these accompanying drawings without paying any creative effort.

DETAILED DESCRIPTION

Figure 1:
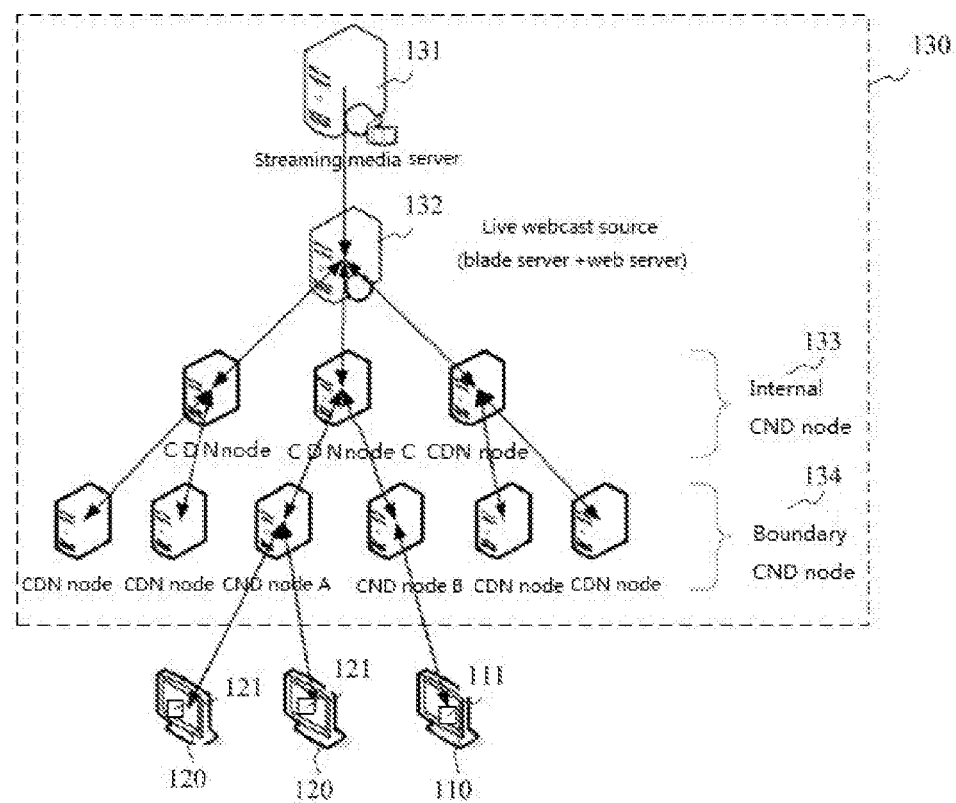
FIG. 1 is a schematic structural diagram of a network live webcast system in accordance with an embodiment of the present disclosure.

Embodiments will be described in detail herein, and embodiments are shown in the accompanying drawings. When the accompanying drawings are involved in the following descriptions, identical numerals in different accompanying drawings indicate identical or similar elements, unless otherwise indicated. The implementations described in the following embodiments do not represent all implementations consistent with the present disclosure. Rather, these implementations are merely embodiments of devices and methods consistent with some aspects of the present disclosure as detailed in the appended claims.

The terminology used herein is for the purpose of describing particular embodiments only and is not intended to limit these embodiment. As used herein, the singular forms "a", "an" and "the" are intended to include the plural forms as well, unless the context clearly indicates otherwise. It will be further understood that the terms "comprises," "comprising," "includes" and/or "including", when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two functions or acts shown in succession may in fact be implemented concurrently or may sometimes be implemented in the reverse order, depending upon the functionality/acts involved.

For each channel, a streamer client transmits a multimedia stream to a server; the server transmits the multimedia stream to a plurality of audience clients corresponding to a plurality of audiences in the channel; and each audience client receives and displays the multimedia stream. The audience client receives text communication information inputted by an input box of the channel, and transmits the text communication information to the server. The server transmits the text communication information to other clients (streamer clients and audience clients) corresponding to other users in this channel. The multimedia stream includes live video stream and live audio stream.

When an audience communicates with other users on the same channel, the audience may manually input text communication information, which causes a low-efficiency communication effective between the audience and other users in the live webcast channel.

First, several terms mentioned in the present disclosure will be introduced:

A live webcast client: refers to an application for processing live webcast over the network. The live webcast client may include a streamer client and an audience client. The streamer client is configured to provide live video stream over a live webcast channel, and a streamer logs in to the streamer client by a streamer identifier. The audience client is configured to play the live video stream; an audience logs in the audience client by an audience identifier.

The streamer identifier may be a user name, a telephone number, an ID number, a character string allocated by the server, or the like. The audience identifier may be a user name, a telephone number, an ID number, a character string allocated by the server, or the like, which is not limited in the embodiments of the present disclosure.

A live webcast channel (also known as a live webcast studio, a room, or the like): refers to a communication set. Each communication set corresponding to each live webcast channel has a corresponding live webcast channel identifier. Each communication set corresponding to each live webcast channel includes a streamer identifier and an audience identifier. Generally, each live webcast channel includes one streamer identifier and at least one audience identifier.

In some embodiments, the streamer client is further configured to provide a live audio stream corresponding to a live webcast channel. Correspondingly, the audience client corresponding to the audience identifier is configured to display the live audio stream.

When the streamer client provides live video stream and/or a live audio stream, the live video stream and/or live audio stream is transmitted to the server over a downlink channel between the streamer client and the server. A first uplink channel for transmitting the live video stream is different from a second uplink channel for transmitting the live audio stream.

When the audience client acquires a live video stream and/or a live audio stream from the server, the live video stream and/or live audio stream is acquired from the server over a downlink channel between the audience client and the server. A first downlink channel for transmitting the live video stream is different from a second downlink channel for transmitting the live audio stream.

The uplink channel refers to a channel over which the client transmits streaming media data to the server, and the downlink channel refers to a channel over which the server transmits streaming media data to the client. The client includes the streamer client and the audience client.

The streaming media data is the live video stream and/or the live audio stream.

In some embodiments, when the streamer client provides both the live video stream and the live audio stream, in order to ensure that the live video stream and the live audio stream the streamer client received at the same moment may be displayed in the audience client at the same moment, and the live video stream and the live audio stream are also provided with a timestamp, wherein the timestamp indicates the time when the live video stream and the live audio stream are obtained.

Referring to FIG. 1, a schematic structural diagram of a network live webcast system in accordance with an embodiment of the present disclosure is illustrated. The network live webcast system includes a first terminal 110, a second terminal 120 and a server 130.

The first terminal 110 and the second terminal 120 may each be a mobile phone, a tablet computer, a portable laptop computer, a desktop computer or the like, which is not limited in the embodiments of the present disclosure.

In some embodiments, a streamer client 111 is installed in the first terminal 110.

The streamer client 111 is configured to capture a live video stream by an image capture assembly of the first terminal 110, and transmits the live video stream to the server 130. Exemplarily, the image capture assembly is a camera.

In some embodiments, the live video stream is a video stream of a user interface of the terminal captured by the image capture assembly of the streamer client 111. For example, the streamer client 111 is configured to capture a live game video stream of the terminal by the image capture assembly.

The streamer client 111 is configured to capture a live audio stream by an audio capture assembly of the first terminal 110, and transmit the live audio stream to the server 130. In some embodiments, the audio capture assembly is a microphone.

The streamer client 111 is configured to transmit the live video stream and the live audio stream over different transmission channels, respectively.

The first terminal 110 is configured to establish communication with the server 130 in a wireless network fashion or a wired network fashion.

The server 130 is configured to provide back-end services for the network live webcast.

In some embodiments, the server 130 transmits streaming media data by a Content Delivery Network (CDN). The server 130 includes a streaming media server 131, a live webcast source server 132, at least one internal CDN node 133 and at least one boundary CDN node 134. The CDN node is a CDN server.

The internal CDN node 133 connects to the live webcast source server 132 and the boundary CDN node 134, and the boundary CDN node 134 connects to the internal CDN node 133, the first terminal 110, and the second terminal 120. The first terminal 110 and the second terminal 120 is connected to the boundary CDN node 134.

The streaming media server 131 is connected to the live webcast source server 132, and the streaming media server 131 transmits the streaming media data to the live webcast source server 132.

With the network architecture above, the first terminal 110 transmits the streaming media data to a boundary CDN node 134 nearby, and then the live webcast source server 132 distributes the streaming media data to different users by the same live webcast channel. Correspondingly, the second terminal 120 acquires the streaming media data from a boundary CDN node 134 nearby. Thus, the transmission efficiency of the streaming media data is improved.

In some embodiments, the server 130 may also be a server cluster includes at least one server which stores the same streaming media data.

The server 103 is further configured to receive the streaming media data transmitted by the streamer client 111, and transmit the streaming media data to the second terminal 120.

The second terminal 120 establishes communication with the server 130 in a wireless network fashion or a wired network fashion.

An audience client 121 is installed in the second terminal 120. The audience client 121 plays the streaming media data uploaded by the streamer client 111, for example, the live video stream and the live audio stream uploaded by the streamer client 111. The streamer client 111 and the audience client 121 are in the same live webcast channel.

In some embodiments, the audience client 121 acquires first audio information by an audio capture assembly of the second terminal 120, and transmits the first audio information to the server 130.

In some embodiments, the audience client 121 transmits the first audio information to the server 130 over an uplink channel between the audience client 121 and the server 130. Correspondingly, the server 130 distributes the first audio information to at least one client pertaining to the live webcast channel over a downlink channel between the server 130 and each client in the same live webcast channel.

In some embodiments, the wireless network or wired network mentioned above may be a standard communication technology and/or protocol. The network is generally the Internet, and may also be any network, including but not limited to: a local area network (LAN), a metropolitan area network (MAN), a wide area network (WAN), a mobile network, a wired network, a wireless network, a private network, a virtual private network or any combination thereof. In some embodiments, technologies and/or formats including hyper text .mark-up language (HTML), extensible markup language (XML) or the like are adopted to represent the data transmitted over the network. In addition, some or all of links may also be encrypted by a conventional encryption technology, such as secure socket layer (SSL), transport layer security (TLS), virtual private network (VPN) or Internet protocol security (IPsec). In other embodiments, it is also possible that the data communication technology is replaced or supplemented with a customized and/or dedicated data communication technology.

In some embodiments, some embodiments are described by taking one first terminal 110 and two second terminals 120 as examples. During practical implementations, there may be at least one first terminal 110, and there may also be at least one second terminal 120, which is not limited in the embodiments of the present disclosure.

Figure 2:
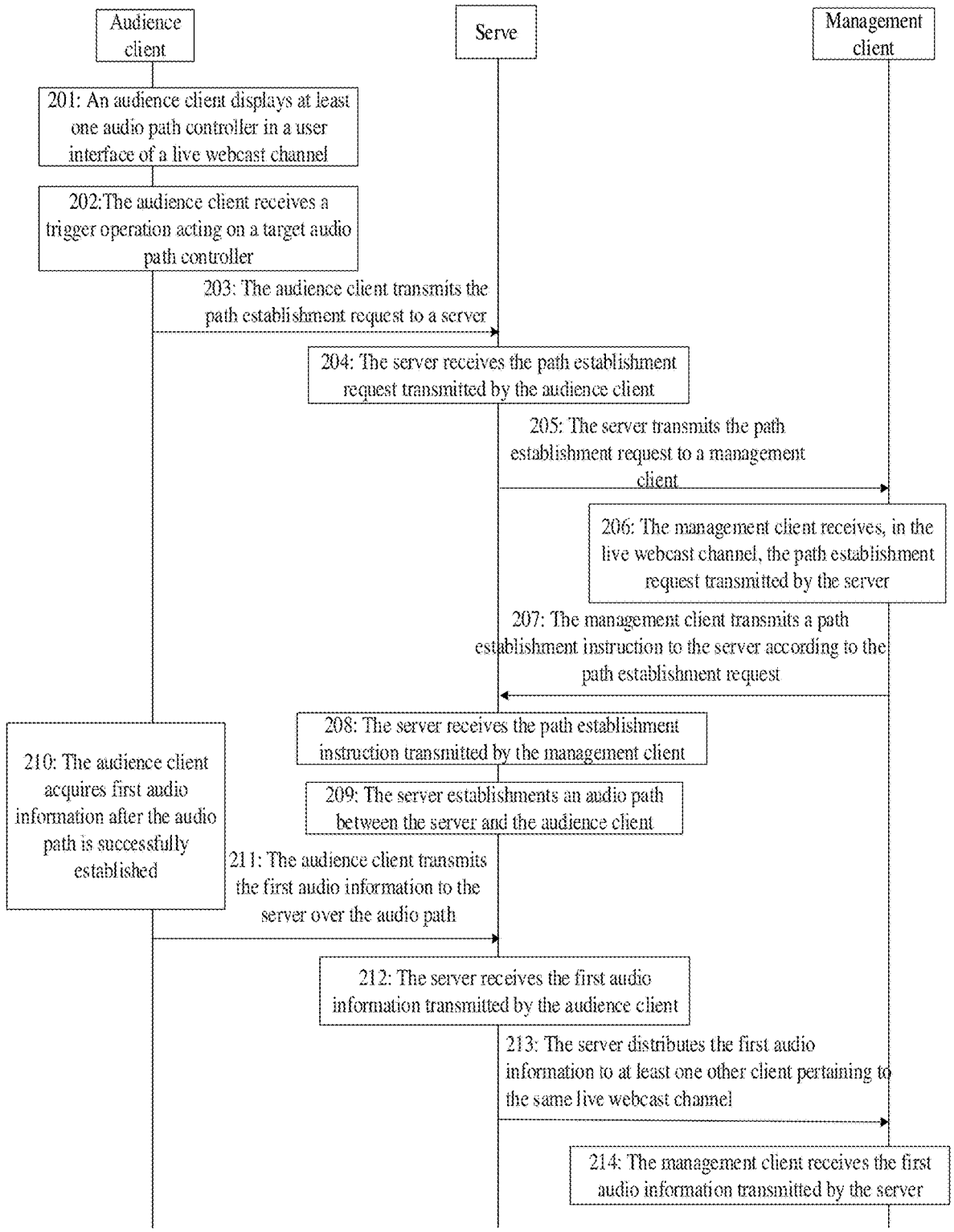
FIG. 2 is a flowchart of a communication method in a live webcast channel in accordance with an embodiment of the present disclosure.

Referring to FIG. 2, a flowchart of a communication method in a live webcast channel in accordance with embodiments of the present disclosure is illustrated. The communication method may be applied in the network live webcast system as illustrated in FIG. 1. The method may include the following steps.

Step 201: An audience client displays at least one audio path control on a user interface of a live webcast channel.

When the audience client runs in a front-end, at least one live webcast channel is displayed. An audience selects a live webcast channel from the at least one live webcast channel and views the live webcast.

Correspondingly, the audience client receives a channel selection operation, then generates a channel selection instruction according to the channel selection operation, and transmits the channel selection instruction to a server. The channel selection instruction includes a live webcast channel identifier corresponding to a live webcast channel. The server transmits streaming media data corresponding to the live webcast channel identifier to the audience client according to the channel selection instruction. The audience client accesses the live webcast channel, and displays, by a user interface of the live webcast channel, live video stream in the streaming media data.

A corresponding relationship between a live webcast channel identifier and a streamer identifier is stored in the server. The live webcast channel identifier identifies a live webcast channel uniquely, and the live webcast channel identifier is a character string allocated by the server. For example, the live webcast channel identifier is 101. Alternatively, the live webcast channel identifier is a streamer identifier of streamer, which is not limited in the embodiments of the present disclosure.

After the audience client accesses to a live webcast channel, at least one audio path control is displayed on the user interface of the live webcast channel. Each audio path control is configured to trigger the establishment of an audio path between an audience client and a server. The audience client may transmit the audio information over the audio path. In this way, the audience client may communicate with other audience clients by voice over the audio path, such that the communication efficiency is improved.

The number of audio path controls is a preset number, and the value of the preset number is not limited in embodiments of the present disclosure. Schematically, there are eight audio path controls.

Each audio path control is configured to indicate an audio path, and different audio path controls correspond to different path identifiers, respectively. Each path identifier indicates an audio path, and the path identifier may be a character string including numbers, letters or the like, which is not limited in the embodiments of the present disclosure. Schematically, each path identifier may be 1, 2, 3 or the like.

In some embodiments, while displaying the audio path control, the terminal displays the path identifier of the audio path corresponding to the audio path control.

In some embodiments, the audio path control is displayed at the upper left corner of a live video which is played by the live webcast channel; or, the audio path control is displayed at the upper right corner of a live video which is played by the live webcast channel. The display position of the audio path control is not limited in the embodiments of present disclosure.

Nevertheless, the audio path control may also be implemented as a physical key provided on the terminal, which is not limited in the embodiments of the present disclosure.

Figure 3:
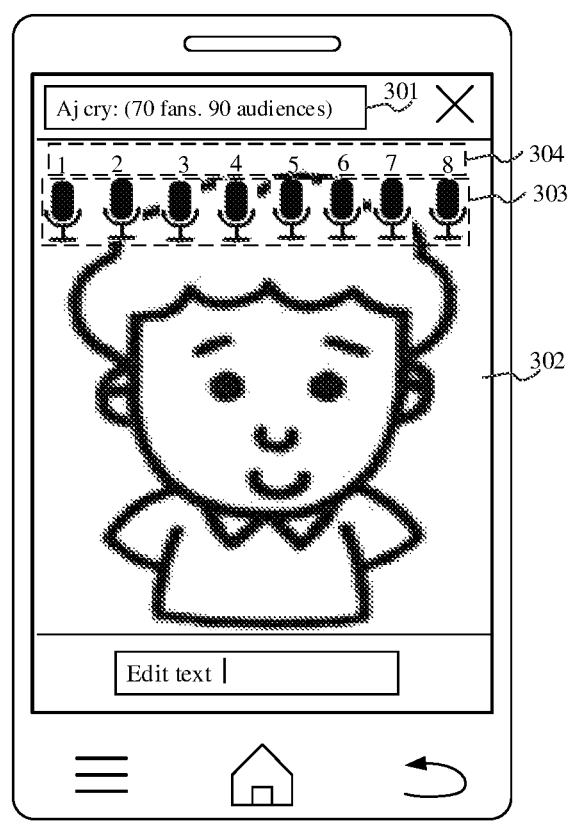
FIG. 3 is a schematic diagram of a live webcast channel in accordance with an embodiment of the present disclosure.

Referring to FIG. 3, after the audience client enters the live webcast channel 301, a live video 302 is displayed on the user interface. Eight audio path controls 303 are displayed in the live video 302, and a path identifier 304 of the audio path corresponding to each audio path control is displayed on each audio path control.

In some embodiments, when the terminal displays the audio path controls, some of the audio path controls may be displayed in the same display interface. When a page turning operation triggered by the user is received, the remaining audio path controls are displayed in the display interface.

In some embodiments, the terminal displays a channel management option before displaying the audio path controls in the live webcast channel. At least one audio path control is displayed when the channel management option is triggered.

In some embodiments, the channel management option is at the upper left corner of a live video which is played by the live webcast channel; or, the channel management option is at the lower left corner of the live video which is played by the live webcast channel; or, the channel management option is at the upper right corner of a live video which is played by the live webcast channel. The display position of the channel management option is not limited in the embodiments of the present disclosure.

Figure 4:
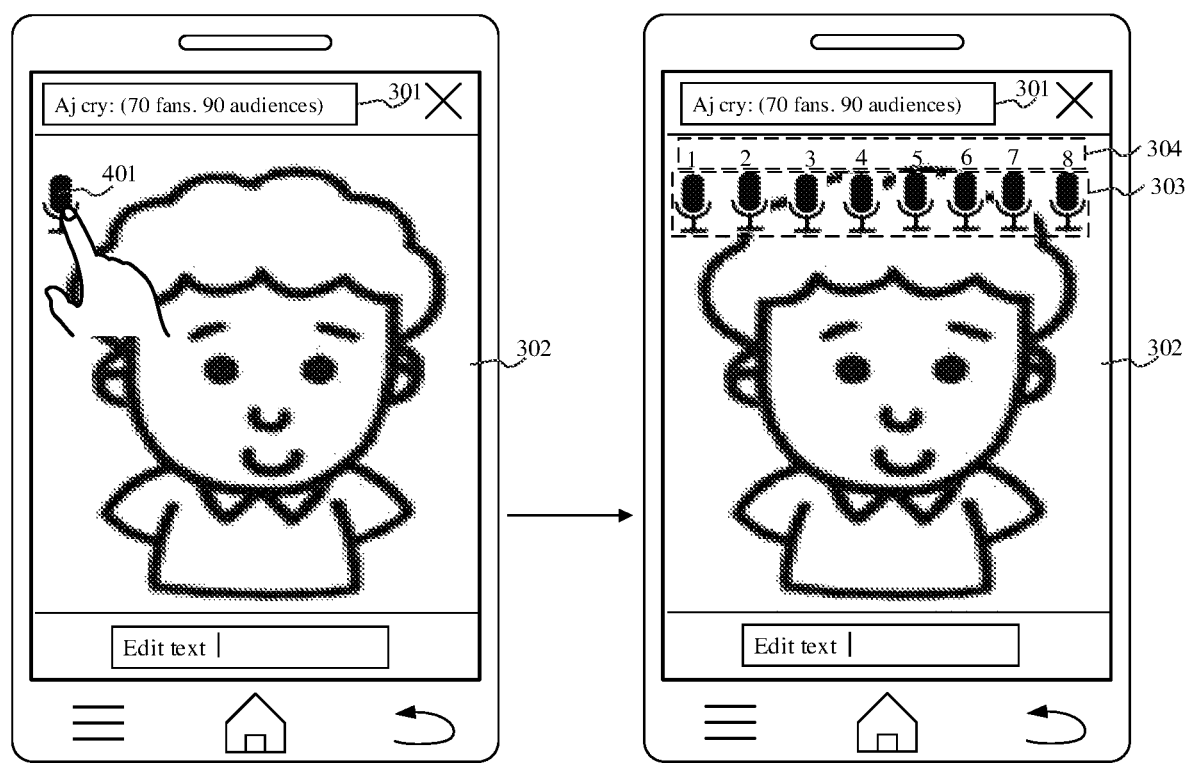
FIG. 4 is a schematic diagram of a live webcast channel in accordance with an embodiment of the present disclosure.

Referring to FIG. 4, after the audience client enters the live webcast channel 301, the live video 302 is displayed on the user interface, and a channel management option 401 is displayed in the live video 302. After the audience client receives an operation acting on the channel management option 401, eight audio path controls 301 are displayed, and the path identifier 304 of the audio path corresponding to each audio path control is displayed on each audio path control.

Step 202: The audience client receives a trigger operation acting on a target audio path control.

When an audience needs to communicate with a streamer in the live webcast channel, a trigger operation is performed on a target audio path control displayed on the audience client.

The target audio path control is one of the at least one audio path control displayed on the user interface.

The trigger operation is to request to establish an audio path corresponding to the target audio path control. In some embodiments, the trigger operation is at least one of a tap operation, a long-press operation, a swipe operation and a voice control operation, which will not be limited in embodiments of the present disclosure.

In some embodiments, the trigger operation may be configured to trigger an operation of sending a path establishment request to the server.

In some embodiments, upon receiving the trigger operation, the audience client generates a path establishment request according to the trigger operation. The path establishment request is to request a server to establish an audio path to the audience client.

In some embodiments, the path establishment request includes a channel identifier, a path identifier and an audience identifier.

Step 203: The audience client transmits the path establishment request to a server.

The audience client transmits the path establishment request to the server, such that the server may establish an audio path between the audience client and the server. In this way, the audience client may transmit the acquired audio information to other clients (including the streamer client and other audience clients) pertaining to the same live webcast channel, and the communication between an audience and other users in the live webcast channel may be achieved without manually inputting communication information by the audience. Accordingly, the efficiency of communication between the audience and other users in the live webcast channel is improved.

Step 204: The server receives the path establishment request transmitted by the audience client.

Step 205: The server transmits the path establishment request to a management client.

The management client is a streamer client or an audience client which is granted an authority for management. In the same live webcast channel, there is at least one management client. The authority for management refers to authority for managing users in the live webcast channel, for example, authority for deleting a user, permit a user to speak or prohibit a user from speaking.

In some embodiments, the management client may restrict an audience client requesting to establish an audio path, such that not all audience clients may establish an audio path.

The server transmits the path establishment request to a management client includes: the server determines, according to the live webcast channel identifier in the path establishment request, a management client corresponding to the live webcast channel identifier, and transmits the path establishment request to the management client.

In some embodiments, when the server transmits the path establishment request to the management client, the live webcast channel identifier is not included in the path establishment request.

In some embodiments, upon receiving the path establishment request, the server directly establishes an audio path to the audience client corresponding to the audience identifier, without transmitting the path establishment request to the management client.

Step 206: The management client receives, in the live webcast channel, the path establishment request transmitted by the server.

Step 207: The management client transmits a path establishment instruction to the server according to the path establishment request.

For example, the management client displays a user interface of the live webcast channel by the terminal on which the management client is installed. When the path establishment request is received, the management client displays the path establishment request on the user interface of the live webcast channel by the terminal on which the management client is installed, and sends, according to the path establishment request, a path establishment instruction to the server.

In one implementation, the transmitting a path establishment instruction to the server by the management client according to the path establishment request includes: acquiring the path identifier in the path establishment request; generating inquiry information according to the path identifier, the inquiry information being to inquire a management user whether to allow establishment an audio path corresponding to the path identifier; outputting the inquiry information; if a channel establishment operation is received, generating a path establishment instruction, and transmitting the path establishment instruction to the server; that is, the path establishment instruction is an instruction sent by the management client when determining that the establishment of the audio path corresponding to the path establishment instruction is permitted; and if an establishment prohibition operation is received, generating an establishment prohibition instruction, and transmitting the establishment prohibition instruction to the server. If the management client transmits the establishment prohibition instruction to the server, the server prohibits establishing an audio path corresponding to the path identifier and transmits establishment prohibition information to the audience client to notify the audience that the establishment of the audio path corresponding to the path identifier has been prohibited.

The path establishment instruction is to instruct the server to establish the audio path corresponding to the path identifier, and the establishment prohibition instruction is to instruct the server to prohibit establishing the audio path corresponding to the path identifier. Both the path establishment instruction and the establishment prohibition instruction include the path identifier and the live webcast channel identifier.

The channel establishment operation is a tap operation, a long-press operation, a swipe operation, a voice control operation or the like, which is not be limited in the embodiments of the present disclosure.

The establishment prohibition operation is a tap operation, a long-press operation, a swipe operation, a voice control operation or the like, which is not be limited in the embodiments of the present disclosure.

In some embodiments, the inquiry information generated by the management client includes the audience identifier, such that a user using the management client may know which audience transmits the path establishment request.

Figure 5:
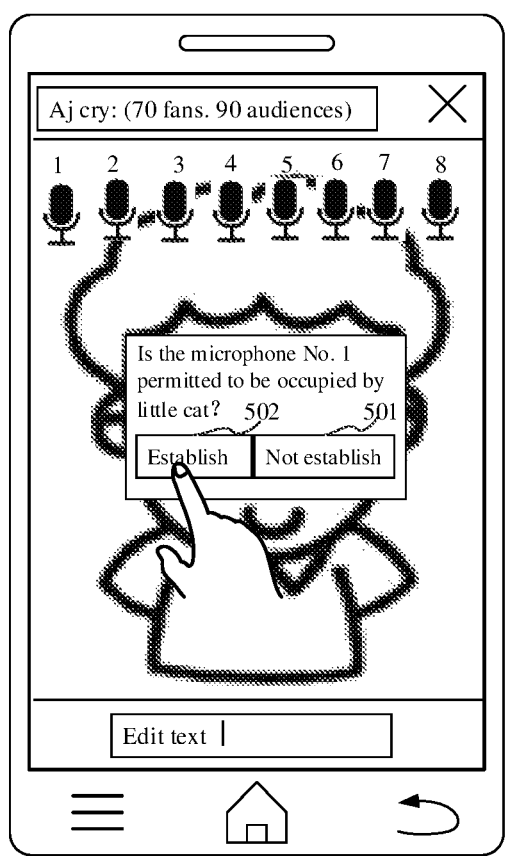
FIG. 5 is a schematic diagram of a live webcast channel in accordance with an embodiment of the present disclosure.

Referring to FIG. 5, upon receiving the path establishment request, the management client generates and displays inquiry information 501. The inquiry information 501 includes the audience identifier and the path identifier. The management client receives a channel establishment operation acting on an establishment option 502, generates a path establishment instruction, and transmits the path establishment instruction to the server.

Step 208: The server receives the path establishment instruction transmitted by the management client.

Step 209: The server establishments an audio path between the server and the audience client.

The server establishes an audio path to the audience client according to the path establishment instruction. The audio path corresponds to the path identifier in the path establishment instruction. That is, the path establishment instruction is to instruct the server to establish the audio path corresponds to the path identifier in the path establishment instruction with the audience client.

In some embodiments, upon establishing the audio path, the server transmits establishment success information to the audience client. The establishment success information is to inform the audience client that the audio path has been successfully established.

Step 210: The audience client acquires first audio information after the audio path is successfully established.

In the embodiments of the present disclosure, the audience client acquires the first audio information when displaying the user interface of and after the audio path is successfully established.

In one implementation, the audience client captures first audio information directly by an audio capture assembly after the audio path is successfully established.

In another implementation, if the audience client receives an audio capture operation after the audio path is successfully established, the audience client captures the first audio information by the audio capture assembly.

The audio capture operation is a tap operation, a long-press operation, a swipe operation and a voice input operation acting on the user interface of the live webcast channel; or the audio capture operation is an operation acting on a physical key provided in the second terminal, which is not limited in the embodiments of the present disclosure.

In some embodiments, the audience client determines the acquired audio signal as the first audio information directly; or the audience client performs an echo cancellation on the acquired audio signal to obtain the first audio information.

The performing an echo cancellation on the acquired audio signal to obtain the first audio information by the audience client includes: after the audio path is successfully established, receiving the audio capture operation, and capturing an audio signal according to the received audio capture operation; comparing the audio signal with second audio information transmitted by the server, wherein the moment the second audio information is received is prior to the moment the audio signal is acquired; removing, by an echo cancellation algorithm, information the same as the second audio information from the acquired audio signal to obtain the first audio information.

Since, in the live webcast channel, the audience client receives the second audio information transmitted by the server and play the second audio information in real time; and if the audio signal acquired by the audience client includes the second audio information, the second audio information may be successively played by each client in the live webcast channel to cause an echo and poor playback effect of the audio information. In some embodiments, by removing the second audio information in the audio signal by an echo cancellation algorithm, the echo caused by successively playing the second audio information by the audience client is eliminated, and the playback effect of the audio information is improved.

The second audio information includes audio information transmitted by the streamer client, and/or audio information transmitted by other audience clients. The other audience clients refer to, in the same live webcast channel, audience clients other than the audience client that acquires the first audio information.

In some embodiments, the echo cancellation algorithm is code developed by the developer of the live webcast client, or is implemented by speex (which is a set of audio compression formats specific for voice) or implemented by programs provided by other manufacturers, which is not limited in the embodiments of the present disclosure.

Step 211: The audience client transmits the first audio information to the server over the audio path.

Step 212: The server receives the first audio information transmitted by the audience client.

Step 213: The server distributes the first audio information to at least one other client pertaining to the same live webcast channel.

In some embodiments, the at least one other client is the streamer client mentioned above, or the at least one other client is a client other than the audience client that transmits the first audio information.

In some embodiments, the server distributes the first audio information to some other clients of which the audience client pertaining to the same live webcast channel. The some other clients are clients specified by the audience client. Or, the server distributes the first audio information to all other clients with an audience client pertaining to the same live webcast channel.

In some embodiments, if the server receives live video stream and a live audio stream transmitted by the streamer client, the server transmits the information to other audience clients.

Step 214: The management client receives the first audio information transmitted by the server.

In some embodiments, if the server transmits the first audio information to all other clients in the same live webcast channel, the first audio information may be received by each of the at least one other client.

In some embodiments, the management client plays the first audio information when receiving the first audio information. Correspondingly, a client, other than the management client and the client which transmits the first audio information, also plays the first audio information when receiving the first audio information.

In summary, the present disclosure provides embodiments of communication method in a live webcast channel, by displaying audio path controls on a user interface of a live webcast channel of an audience client; receiving a trigger operation acting on an audio path control; generating a path establishment request according to the trigger operation and transmitting the path establishment request to a server; establishing, by the server, an audio path to the audience client according to the path establishment request; thereby the problem of low communication efficiency when an audience communicates with other users by text information is solved. Since the audience may communicate by voice with other users in the same live webcast channel over an audio path between the audience client and a server, the communication efficiency of the audience in the live webcast channel is improved.

Additionally, a path establishment request is transmitted to a management client by the server, and the management client determines whether to establish an audio path, the server does not need to establish an audio path for each audience client that transmits the path establishment request, such that the burden on the server to establish the audio path is reduced.

In some embodiments, steps 201 to 203, 210 and 211 may be separately implemented as the method embodiment on the audience client side; steps 204, 205, 208, 209, 212 and 213 may be separately implemented as the method embodiment on the server side; and, steps 206, 207 and 214 may be separately implemented as the method embodiment on the management client side, which is not limited in the embodiments of the present disclosure.

In some embodiments, based on the embodiment as illustrated in FIG. 2, the management client sets an authority for each the audio path corresponding to each audio path control in the live webcast channel.

Figure 6:
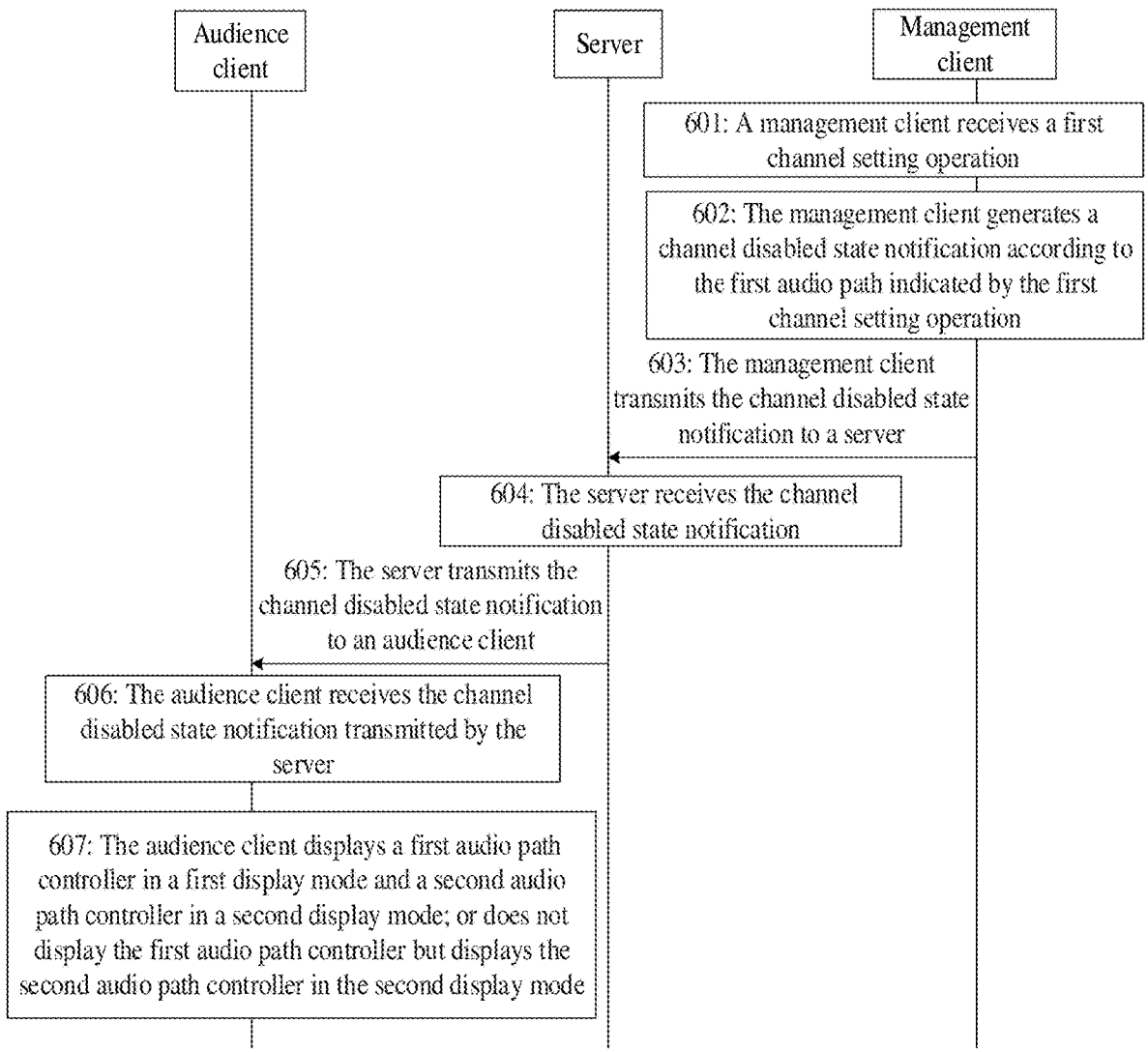
FIG. 6 is a flowchart of a communication method in a live webcast channel in accordance with another embodiment of the present disclosure.

Referring to FIG. 6, a flowchart of a communication method in a live webcast channel in accordance with another embodiment of the present disclosure is illustrated. The communication method is applied in the network live webcast system as illustrated in FIG. 1. The method may include the following steps.

Step 601: A management client receives a first channel setting operation.

The first channel setting operation is to set a first audio path to be in an establishment prohibited state. The first audio path is one of a plurality of uplink channels for transmitting audio information.

The state of the audio path includes an establishment prohibited state and an establishment permitted state. The establishment prohibited state means that the server is prohibited from establishing the audio path according to the path establishment request. The establishment permitted state means that the server is permitted to establish the audio path according to the path establishment request.

The first channel setting operation is a tap operation, a long-press operation, a swipe operation, a voice control operation or the like, which is not limited in the embodiments of the present disclosure.

In some embodiments, when the management client is a streamer client, the streamer client receives the first channel setting operation when the live webcast channel is created; or, the streamer client receives the first channel setting operation after the live webcast channel is created; or, the streamer client receives the first channel setting operation after the first audio path is established. The time when the streamer client receives the first channel setting operation is not limited in the embodiments of the present disclosure.

In some embodiments, when the management client is an audience client, the audience client receives the first channel setting operation after the live webcast channel is created and before the first audio path is established; or, the management client receives the first channel setting operation after the first audio path is established. The time when the management client receives the first channel setting operation is not limited in the embodiments of the present disclosure.

Figure 7:
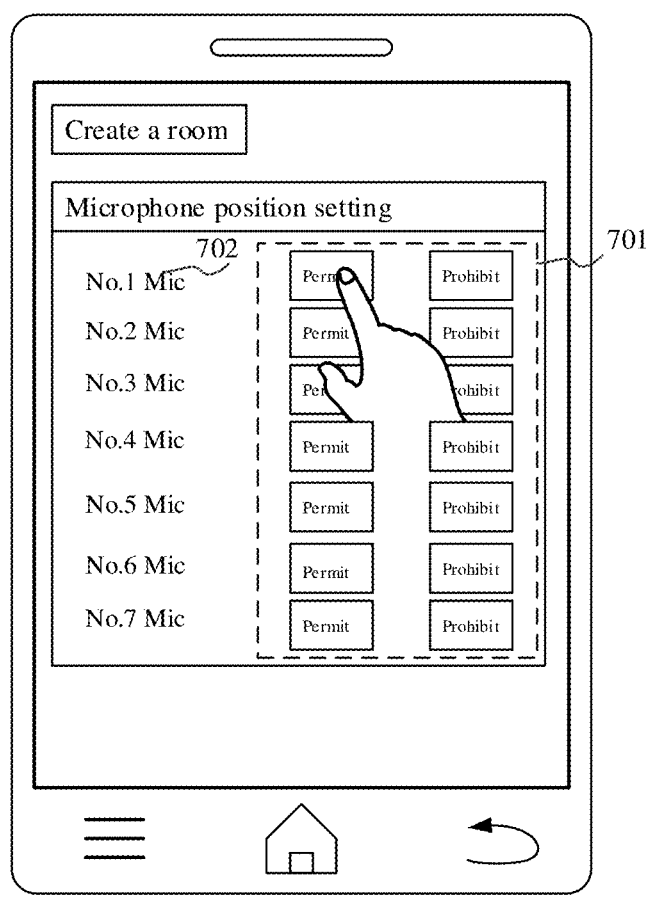
FIG. 7 is a schematic diagram of setting an audio path in accordance with an embodiment of the present disclosure.

Referring to FIG. 7, when the live webcast channel is created, the streamer client displays setup information 701 of each audio path. The setup information 701 is to remind a streamer whether the corresponding audio path is permitted to be established. The streamer client receives the first channel setting operation acting on the setup information 701, and an audio path 702 corresponding to the setup information 701 is prohibited from establishment.

In some embodiments, at least one audio path control is displayed on a user interface of the live webcast channel of the management client. When the management client is a streamer client, the management client sets the state of the first audio path by receiving a first channel setting operation acting on a first audio path control. The first audio path control is one of the at least one audio path control.

The at least one audio path control displayed by the streamer client is the same as the at least one audio path control displayed by the audience client.

Figure 8:
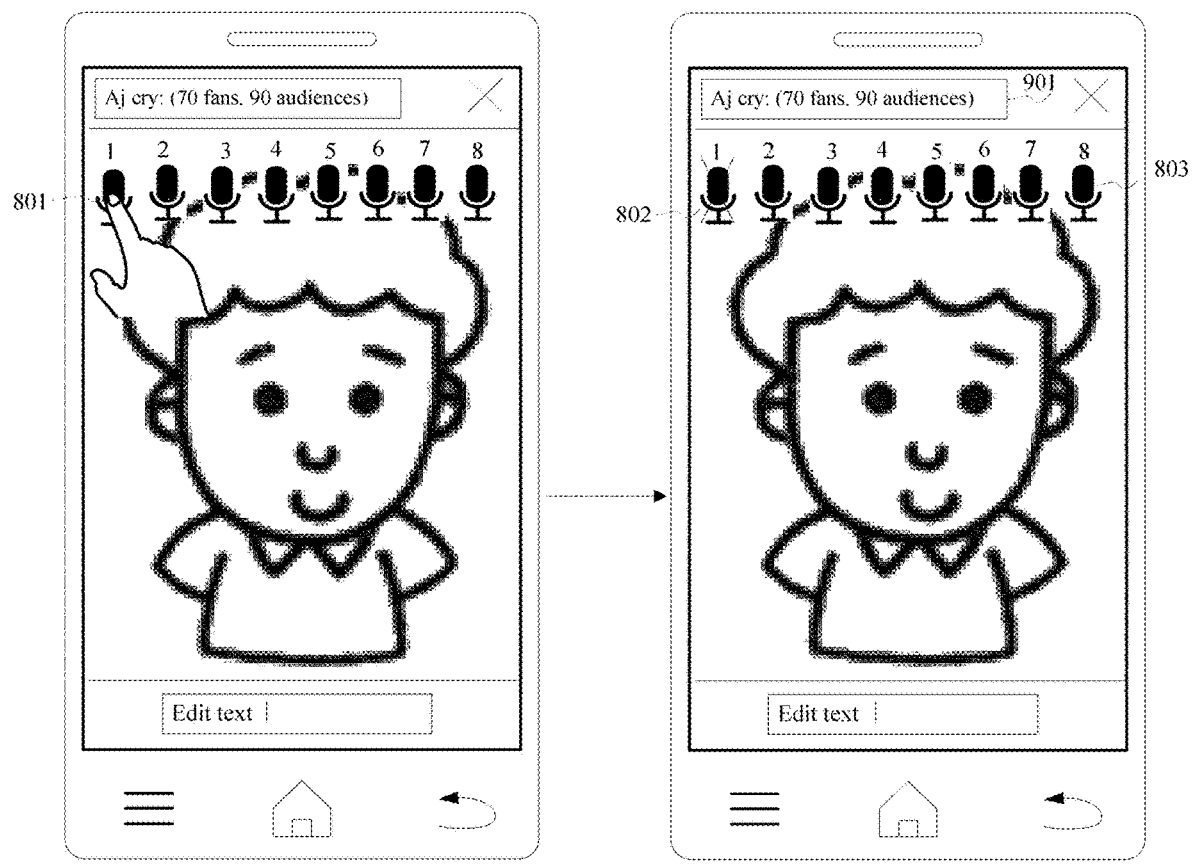
FIG. 8 is a schematic diagram of setting an audio path in accordance with an embodiment of the present disclosure.

Referring to FIG. 8, the streamer client displays eight audio path controls, the streamer client receives the first channel setting operation acting on the first audio path control 801, and the first audio path corresponding to the first audio path control 801 is prohibited from establishment.

In some embodiments, upon receiving the first channel setting operation acting on the audio path control, the management client displays, on the user interface of the live webcast channel, the first audio path control in a first display mode, or does not display the first audio path control on the user interface of the live webcast channel.

In some embodiments, the management client displays, on the user interface of the live webcast channel, a second audio path control in a second display mode. An audio path corresponding to the second audio path control is in an establishment permitted state.

The first display mode is to indicate that the audio path corresponding to the first audio path control is in an establishment prohibited state. The second display mode is to indicate that the audio path corresponding to the second audio path control is in an establishment permitted state.

In some embodiments, the first display mode is different from the second display mode. The first display mode and the second display mode are not limited in the embodiments of the present disclosure. Schematically, the first display mode is to display in form of a first default image, and the second display mode is to display in form of a second default image.

Referring to FIG. 8, if the streamer client receives the first channel setting operation acting on the first audio path control 801, in the live webcast channel of the streamer client, the first audio path control 801 is displayed in form of a first default image 802, and the remaining audio path controls are displayed in form of second default images 803.

Step 602: The management client generates a channel disabled state notification according to the first audio path indicated by the first channel setting operation.

The channel disabled state notification includes a path identifier corresponding to the first audio path and a live webcast channel identifier corresponding to the live webcast channel. The channel disabled state notification is to notify the server that, in the live webcast channel corresponding to the live webcast channel identifier, the first audio path corresponding to the path identifier is in an establishment prohibited state.

Step 603: The management client transmits the channel disabled state notification to a server.

Step 604: The server receives the channel disabled state notification.

Upon receiving the channel disabled state notification, the server sets the first audio path corresponding to the path identifier in the live webcast channel corresponding to the live webcast channel identifier to be in the establishment prohibited state.

In some embodiments, the manner of setting, by the server, the first audio path to be in the establishment prohibited state is: modifying the state identifier of the first audio path as a state identifier corresponding to the establishment prohibited state.

The representation of the state identifier is not limited in the embodiments of the present disclosure. Schematically, the state identifier corresponding to the establishment prohibited state is represented by 1, and the state identifier corresponding to the establishment permitted state is represented by 0.

Step 605: The server transmits the channel disabled state notification to an audience client.

Step 606: The audience client receives the channel disabled state notification transmitted by the server.

Step 607: The audience client displays a first audio path control in a first display mode and a second audio path control in a second display mode; or does not display the first audio path control but displays the second audio path control in the second audio path control.

Since the first audio path corresponding to the first audio path control has been prohibited from establishment by the management client, in order to remind the audience that the first audio path fails to be established, the audience client displays the first audio path control in the first display mode or does not display the first audio path control.

In some embodiments, in order to ensure the synchronization between the audience client and the management client, when the management client displays the first audio path option in the first display mode, the audience client also displays the first audio path option in the first display mode; and when the management client does not display the first audio path option, the audience client does not display the first audio path option either.

In some embodiments, other clients in the same live webcast channel display the first audio path control and the second audio path control in a manner the same as the management client and the audience client. That is, the first audio path control is displayed in the first display mode and the second audio path control is displayed in the second display mode; or the first audio path control is not displayed, but the second audio path control is displayed in the second display mode.

In summary, in the communication method in a live webcast channel of embodiments of the present disclosure, by managing each audio path by the management client, the server does not need to establish all audio paths, such that the burden on the server to establish audio paths is reduced.

In some embodiments, steps 601 to 603 may be separately implemented as the method embodiment on the management client side; steps 604 and 605 may be separately implemented as the method embodiment on the server side; and, steps 606 and 607 separately implemented as the method embodiment on the server side the audience client side, which are not limited in the embodiments of the present disclosure.

In some embodiments, based on the embodiment as illustrated in FIG. 6, after the management client disables an audio path, the permission to establish the audio path may also be restored.

Figure 9:
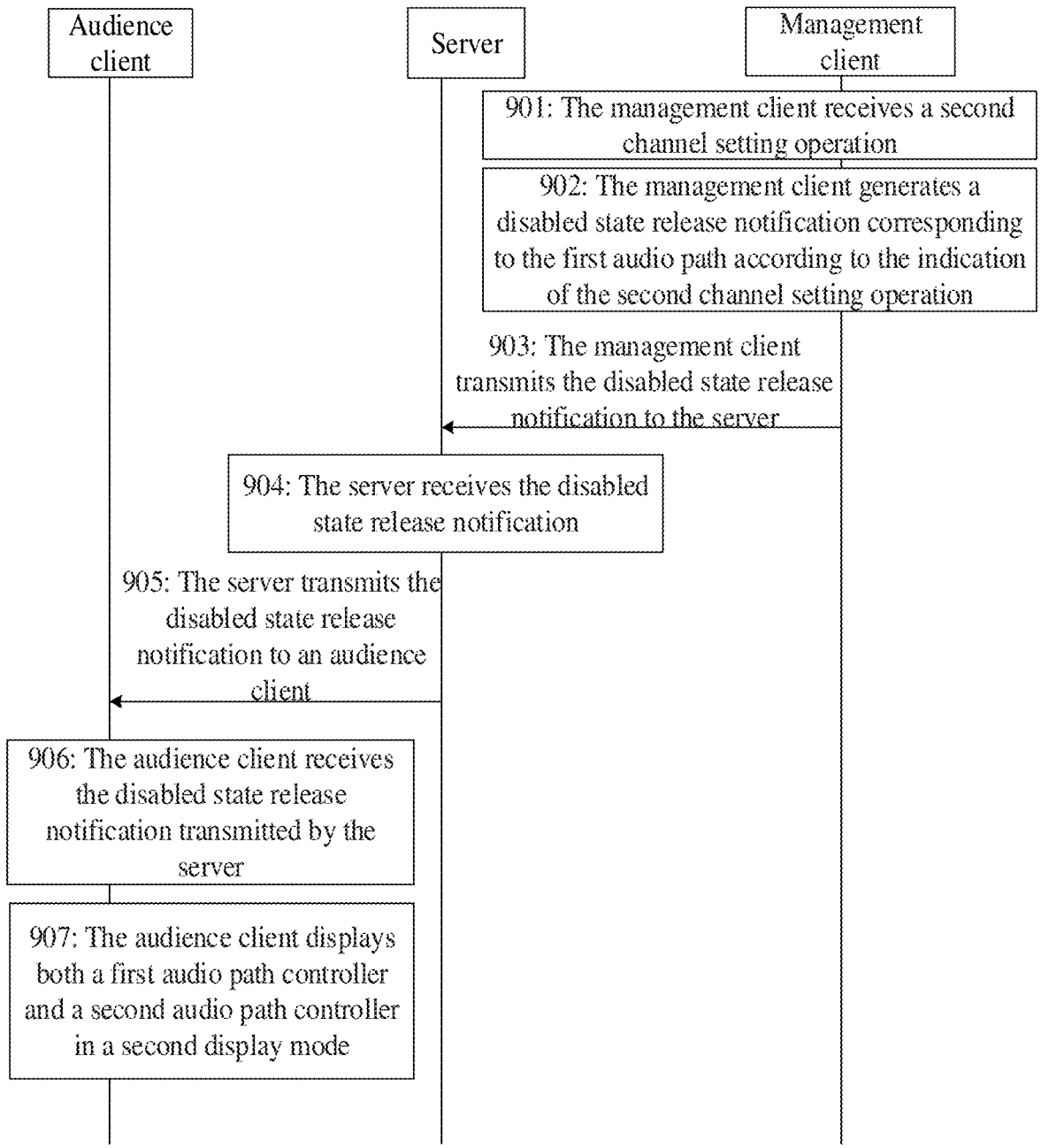
FIG. 9 is a flowchart of a communication method in a live webcast channel in accordance with another embodiment of the present disclosure.

Referring to FIG. 9, a flowchart of a communication method in a live webcast channel in accordance with another embodiment of the present disclosure is illustrated. The communication method is applied in the network live webcast system as illustrated in FIG. 1. After step 703, the method may include the following steps.

Step 901: The management client receives a second channel set operation.

The second channel setting operation is to switch the first audio path from the establishment prohibited state to the establishment permitted state. The second channel setting operation is a tap operation, a long-press operation, a swipe operation, a voice control operation or the like, which is not be limited in embodiments of the present disclosure.

In some embodiments, the management client receives the second channel setting operation after receiving the first channel setting operation, or receives the second channel setting operation after receiving a path establishment request. The time when the management client receives the second channel setting operation is not limited in the embodiments of the present disclosure.

Figure 10:
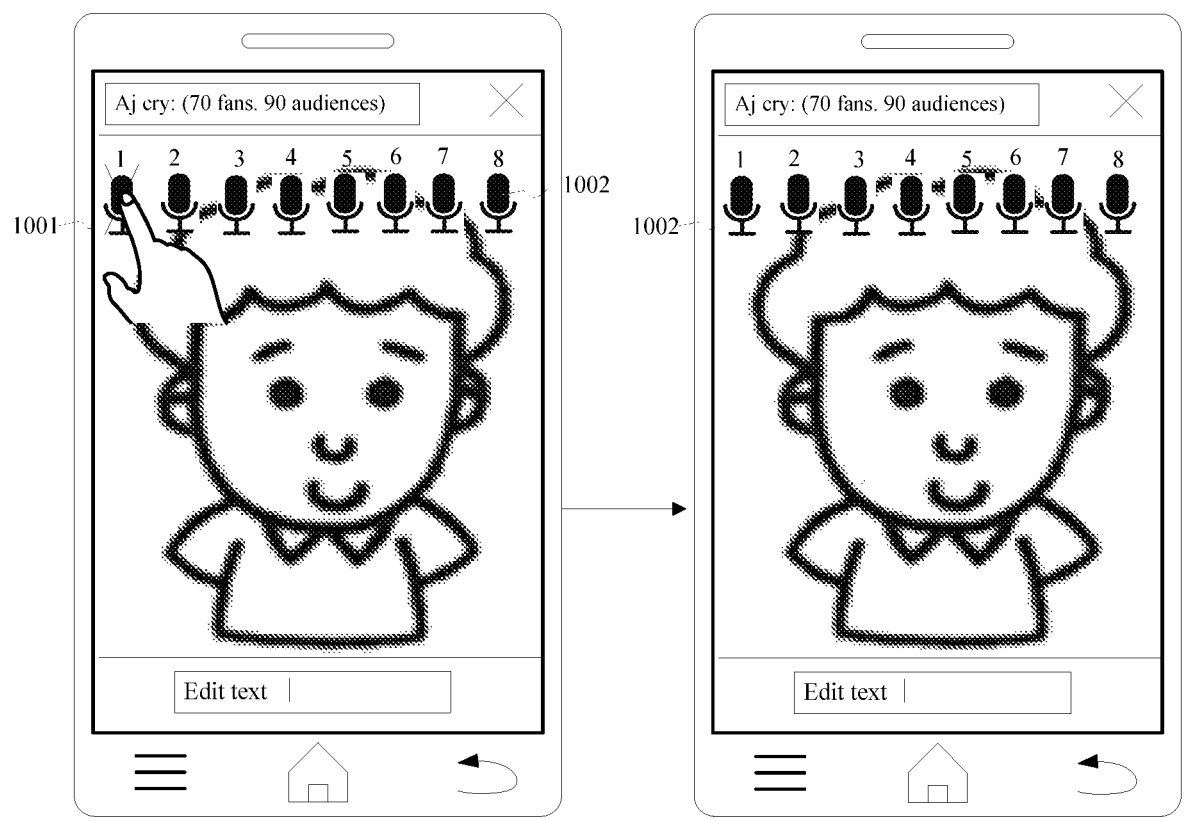
FIG. 10 is a schematic diagram of setting an audio path in accordance with an embodiment of the present disclosure.

Referring to FIG. 10, on the user interface of the live webcast channel, the management client displays a first audio path control 1002 in form of a first default image 1001, and displays the remaining audio path controls in form of second default images 1002. The management client receives the second channel setting operation acting on the first audio path control 1002, and displays the first audio path control 1002 in form of a second default image 1002.

Step 902: The management client generates a disabled state release notification corresponding to the first audio path according to the indication of the second channel setting operation.

The disabled state release notification includes a path identifier of the first audio path and a live webcast channel identifier. The disabled state release notification is to notify the server that the first audio path in the live webcast channel corresponding to the live webcast channel identifier is in an establishment permitted state.

Step 903: The management client transmits the disabled state release notification to the server.

Step 904: The server receives the disabled state release notification.

Upon receiving the disabled state release notification, the server modifies state of the first audio path corresponding to the path identifier in the live webcast channel corresponding to the live webcast channel identifier from the establishment prohibited state to the establishment permitted state.

In some embodiments, the manner of modifying, by the server, state of the first audio path corresponding to the path identifier in the live webcast channel corresponding to the live webcast channel identifier from the establishment prohibited state to the establishment permitted state is: modifying the state identifier of the first audio path from a state identifier corresponding to the establishment prohibited state to a state identifier corresponding to the establishment permitted state. Schematically, the state identifier of the first audio path is modified from 1 to 0.

Step 905: The server transmits the disabled state release notification to an audience client.

Step 906: The audience client receives the disabled state release notification transmitted by the server.

Step 907: The audience client displays both a first audio path control and a second audio path control in a second display mode.

At this time, a first audio path corresponding to the first audio path control is permitted to be established, so both the first audio path control and the second audio path control are displayed in the same way, i.e., in the second display mode.

In summary, in the embodiments of the communication method in a live webcast channel, by restoring, by the management client, the permission to establish the first audio, a management user may flexibly restore the audio path that has been prohibited from establishment, such that the flexibility of setting the audio path is improved.

In some embodiments, steps 901 to 903 may be separately implemented as the method embodiment on the management client side; steps 904 and 905 may be separately implemented as the method embodiment on the server side; and steps 906 and 907 may be separately implemented as the method embodiment on the audience client side, which are not limited in the embodiments of the present disclosure.

In some embodiments, based on the above embodiments, after step 209, if the audio path between the audience client and the server is successfully established, a target audio path control is displayed in the audience client in a third display mode.

In some embodiments, in order to enable each client in the same live webcast channel to know which audio path is occupied, the server distributes the path identifier in the path establishment request to all clients pertaining to the same live webcast channel.

Upon receiving the path identifier, each client displays an audio path control corresponding to the path identifier in a third display mode, to remind the user that the audio path corresponding to the audio path control is occupied.

In some embodiments, the third display mode includes, but not limited to: displaying in a preset color, displaying in a preset size, displaying an avatar icon corresponding to an audience identifier occupying the audio path, and displaying in form of a preset picture. Nevertheless, the third display mode also includes other forms and is not enumerated here in the embodiments of the present disclosure.

In some embodiments, the description is given by taking the third display mode being displaying an avatar icon corresponding to an audience identifier occupying the audio path as an example. In this scenario, upon receiving the path establishment request, the server also needs to searches, in the pre-stored user information, for an avatar icon corresponding to the audience identifier in the path establishment request, and transmits the avatar icon to each client in the same live webcast channel. Upon receiving the avatar icon, each client modifies a default icon of an audio path control corresponding to the live webcast channel identifier as the avatar icon.

The user information is information corresponding to the audience identifier. The user information includes: an avatar icon, an ID number, a user name, user's friends, a user identifier allocated by the server, user authority or the like, which is not be limited in the embodiments of the present disclosure.

In some embodiments, the default icon is the same as the second default image.

Figure 11:
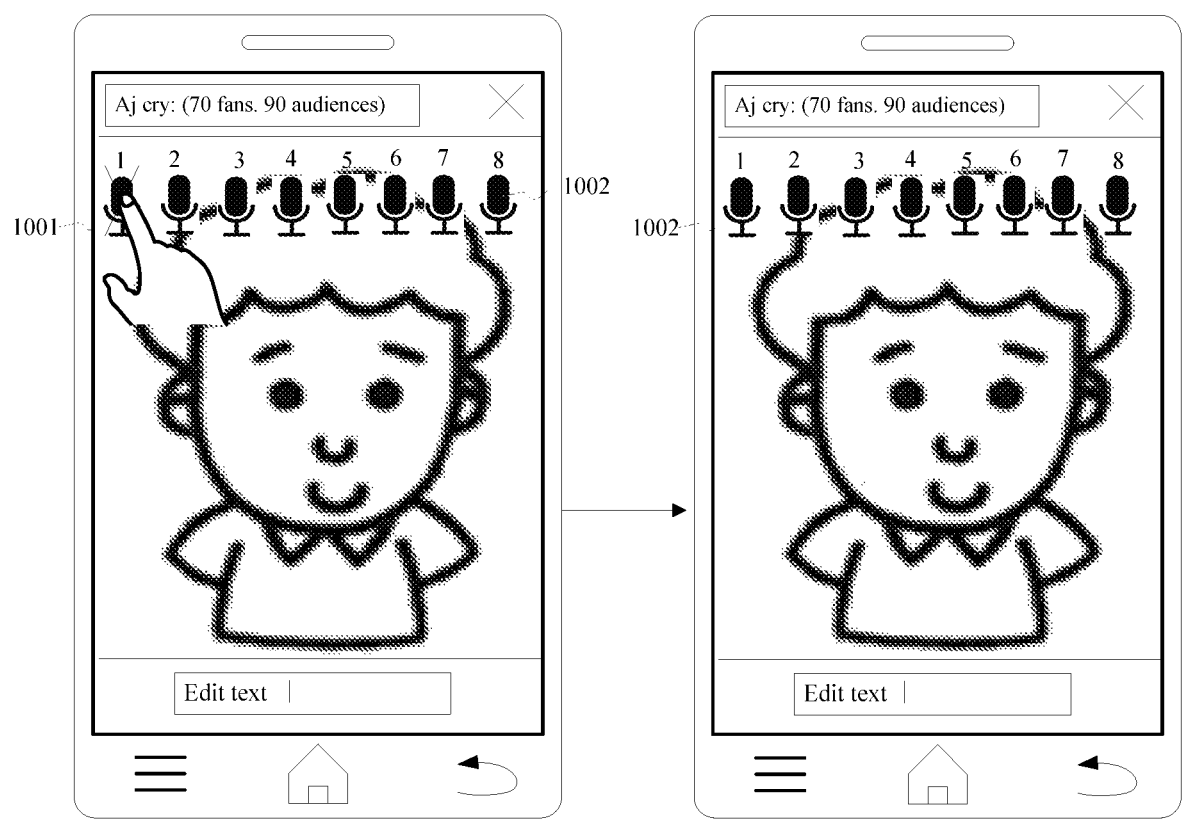
FIG. 11 is a schematic diagram of a live webcast channel in accordance with an embodiment of the present disclosure.

Referring to FIG. 11, the path identifier contained in the path establishment request transmitted by the audience client is "1". The server transmits the path identifier "1" to each client in the live webcast channel. On the user interface of the live webcast channel of each client, the audio path control 1101 is modified from the default icon 1102 to the avatar icon 1103 corresponding to the audience identifier.

In some embodiments, the clients above include the management client in the live webcast channel.

In some embodiments, based on the above embodiments, in step 211, when the audience client transmits the first audio information to the serer over the audio path, the audience client also displays a target audio path control in a fourth display mode.

In some embodiments, upon receiving second audio information transmitted by the server, the audience client displays a fourth audio path control corresponding to the second audio information in a fourth display mode. The second audio information is transmitted to the server by other audience clients. The fourth audio path control is an audio path control in the at least one audio path control.

In some embodiments, the fourth audio path control includes the target audio path control. The number of fourth audio path controls is determined according to the number of audio paths over which the audio information is being transmitted.

In some embodiments, when the audience client transmits the first audio information to the server, the audience client also transmits a path identifier to the server; the server transmits the path identifier to other clients in the same channel; and each client displays an audio path control corresponding to the path identifier in a fourth display mode.

The fourth display mode is to indicate that audio information is being transmitted on the audio path corresponding to the fourth audio path control. The fourth display mode is not limited in the embodiments of the present disclosure. Schematically, the fourth display mode is to display the audio path control in an enlarged manner. In this way, by the audio path control displayed in the fourth display mode, each user in the same live webcast channel may know that the audience client corresponding to the audio path control is speaking.

Figure 12:
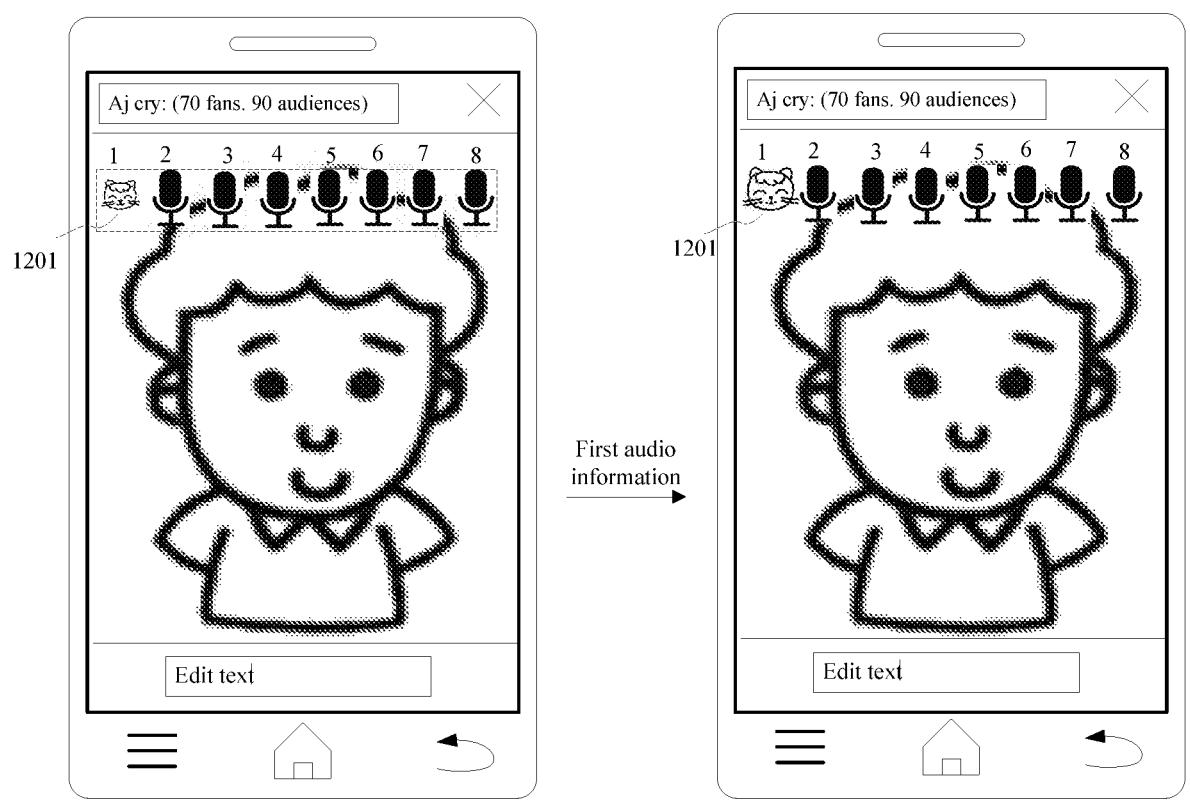
FIG. 12 is a schematic diagram of a live webcast channel in accordance with an embodiment of the present disclosure.

Referring to FIG. 12, the audience client displays each audio path control in the live webcast channel. When the audience client establishes an audio path to the server by an audio path control 1202 and if the audience client acquires the first audio information, the audio path control 1201 is displayed in an enlarged manner.

In some embodiments, based on the above embodiments, after step 210, the audience client receives a capture stop operation, and stops capturing the first audio information according to the capture stop operation.

Figure 13:
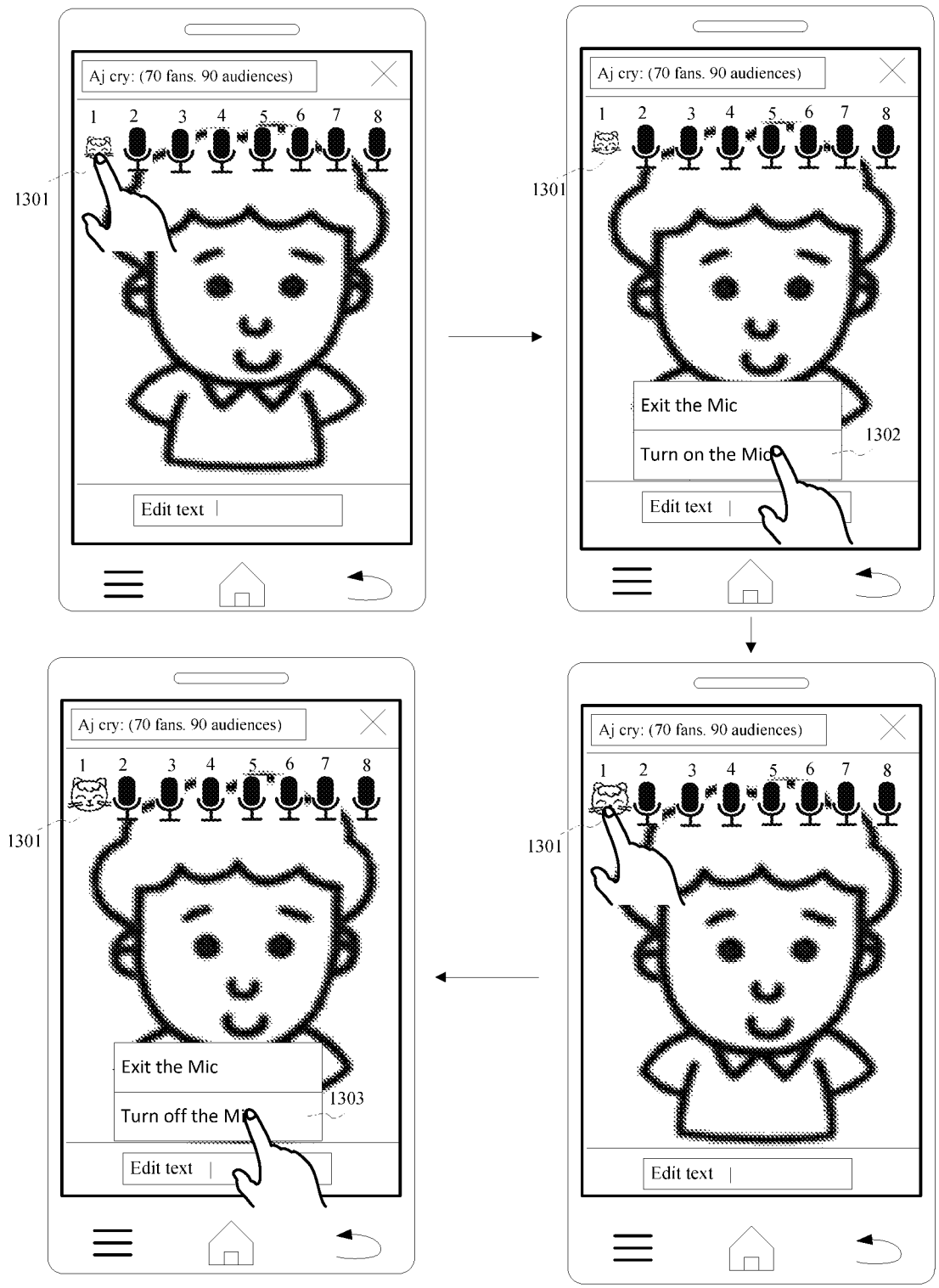
FIG. 13 is a schematic diagram of a live webcast channel in accordance with an embodiment of the present disclosure.

Referring to FIG. 13, the audience client displays each audio path control in the live webcast channel. After the audience client establishes an audio path to the server by an audio path control 1301 and if the audience client receives an operation acting on the audio path control 1301, an audio capture option 1302 is displayed. Upon receiving an audio capture operation acting on the audio capture option 1302, the audience client starts to acquire the first audio information. Then, if the audience client receives an operation acting on the audio path control 1301, a capture stop option 1303 is displayed. Upon receiving a capture stop operation acting on the capture stop option 1303, the audience client stops acquiring the first audio information.

In some embodiments, based on the above embodiments, after step 209, the audience client receives a disconnect operation, then generates a channel disconnect instruction according to the disconnect operation; and transmits the channel disconnect instruction to the server. The server disconnects the audio path to the audience client according to the channel disconnect instruction.

In some embodiments, upon receiving a disconnect operation, the audience client displays a target audio path control in a second display mode.

The disconnect operation is a tap operation, a long-press operation, a swipe operation or other operations acting on the user interface of the live webcast channel; or, the disconnect operation is an operation acting on a preset physical key; or, the disconnect operation is a voice input operation, which is not be limited in the embodiments of the present disclosure.

In some embodiments, the channel disconnect instruction includes a live webcast channel identifier and a path identifier. The server disconnects an audio path corresponding to the path identifier in the live webcast channel corresponding to the live webcast channel identifier.

In some embodiments, the server transmits the path identifier in the channel disconnect instruction to other clients in the same live webcast channel, and each client displays the audio path control corresponding to the path identifier in a second display mode, such that each user in the live webcast channel knows that the audio path corresponding to the path identifier has been disconnected.

Figure 14:
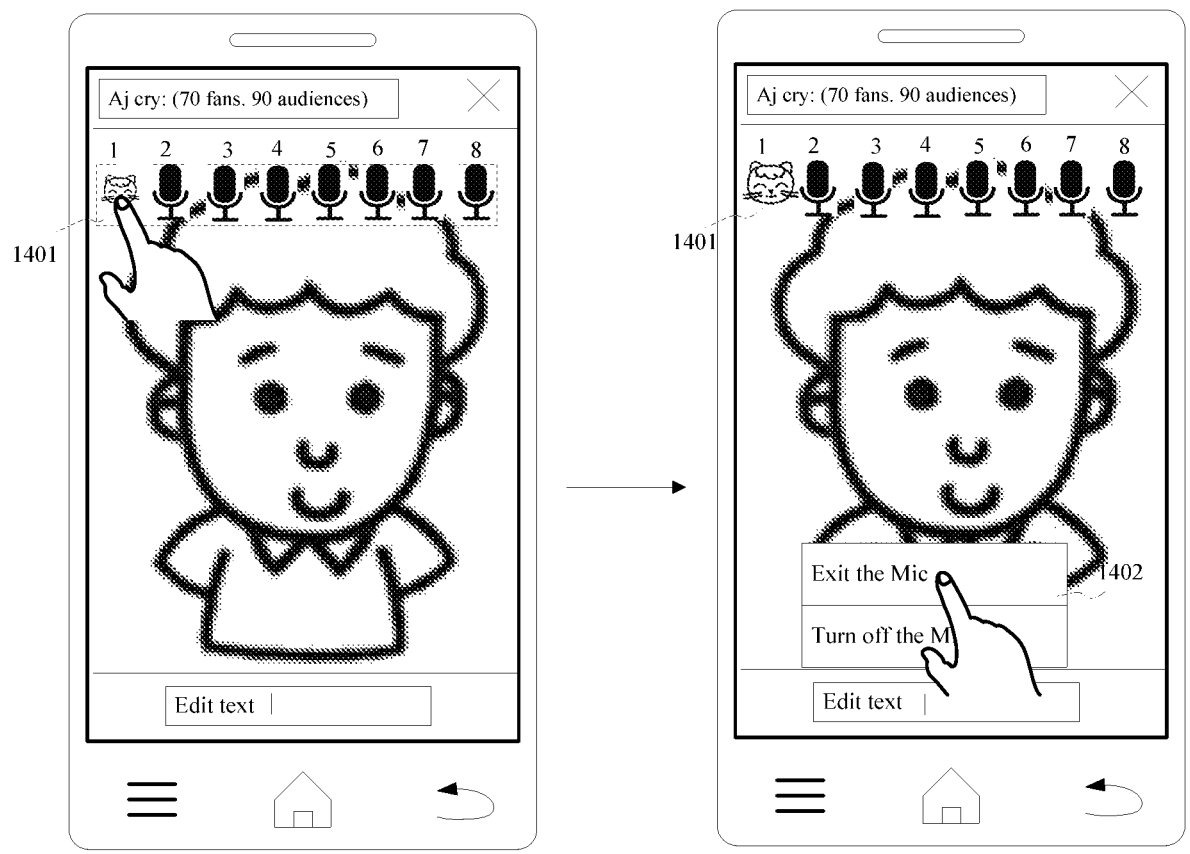
FIG. 14 is a schematic diagram of a live webcast channel in accordance with an embodiment of the present disclosure.

Referring to FIG. 14, the audience client displays each audio path control in the live webcast channel. After the audience client establishes an audio path to the server by an audio path control 1401 and if the audience client receives an operation acting on the audio path control 1401, a channel disconnect option 1402 is displayed. Upon receiving a channel disconnect operation acting on the channel disconnect option 1402, the audience client generates a channel disconnect instruction. After an audio path corresponding to the audio path control 1401 is disconnected, a display interface as illustrated in FIG. 3 is displayed.

In some embodiments, based on the above embodiments, when an audience client runs in the back-end, the audience client is prohibited from acquiring live video pictures from the server. In this way, the resources occupied by the audience client may be saved.

It is to be noted that, on a user interface of a live webcast channel of a same client, audio path controls may be simultaneously displayed in at least two display modes. For example, on the user interface of the live webcast channel, an audio path control corresponding to an identifier "1" is displayed in a first display mode, an audio path control corresponding to an identifier "2" is displayed in a second display mode, an audio path control corresponding to an identifier "3" is displayed in a third display mode, and the remaining audio path controls are displayed in a fourth display mode.

The following description is given by taking an audience client viewing a live game of a streamer in a live webcast channel as an example.

After a streamer creates a live webcast channel, the streamer directly live streams a game over the live webcast channel. That is, the streamer transmits a game video and a game audio to a server, and the server transmits the game video and the game audio to an audience client corresponding to each audience in the live webcast channel.

If an audience performs voice communication with other users in the live webcast channel, an audio path control in the live webcast channel is tapped, and the audience client generates a path establishment request according to the tap operation and transmits the path establishment request to a server. The server transmits the path establishment request to a management client. The management client generates a path establishment instruction according to a path identifier in the path establishment request and/or user information of the audience client, and transmits the path establishment instruction to the server. The server establishes an audio path corresponding to the path identifier in the path establishment request.

Additionally, the audience client transmits first audio information over the established audio path. In this way, the audience may perform voice communication with other users in the live webcast channel over the audio path, so as to implement the function of advising the streamer to play the game or discuss the game with other audiences.

Additionally, by performing voice communication with the streamer, the audience may know the address of the game played by the streamer and thus participate in the game played by the streamer, so as to achieve the function of participating in the game together with strangers.

Additionally, when the audience client runs in the backend, the audience client is prohibited from acquiring live video pictures, such that the resources of the terminal occupied by the audience client are saved and the operating speed of other applications is improved.

Additionally, when the audience client runs in the backend, only the processes related to the capture of the first audio information, the transmission of the first audio information and the receiving of the second audio information are operated, and other processes of the audience client are prohibited from operating, such that the resources of the terminal occupied by the audience client are saved and the operating speed of other applications is improved.

Additionally, the audience client does not acquire the image information of the audience during the live webcast of the game, so the resources consumed by the server to transmit the image information are saved, and the transmission payload of the server is saved.

Through the above method, during the live webcast of the game, the delay of the live webcast is controlled within 500 ms, such that the live webcast effect is improved.

Embodiments of apparatuses of the present disclosure will be described below. The embodiments of apparatuses may be configured to practice the embodiments of methods of the present disclosure. For details not disclosed in the embodiments of apparatuses of the present disclosure, reference may be made to the embodiments of methods of the present disclosure.

Figure 15:
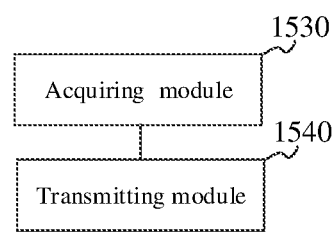
FIG. 15 is a block diagram of a communication apparatus in a live webcast channel in accordance with an embodiment of the present disclosure.

Referring to FIG. 15, a block diagram of a communication apparatus in a live webcast channel according to an embodiment of the present disclosure is illustrated. The apparatus has functions of practicing the method embodiments. The functions may be implemented by hardware or by running corresponding software by hardware. The device may be applied to a terminal on which the audience terminal is installed. For example, the terminal may be the second terminal 120 in the system as illustrated in FIG. 1. The apparatus may include an acquiring module 1530 and a transmitting module 1540.

The acquiring module 1530 is configured to acquire first audio information when displaying a user interface of the live webcast channel.

The transmitting module 1540 is configured to transmit the first audio information to a server over the audio path to the server. The server is configured to distribute the first audio information to at least one other client pertaining to the live webcast channel, the at least one other client being the streamer client, or the at least one other client being a client other than the audience client that transmits the first audio information, the audio path being established by a request to the server according to a trigger operation, the trigger operation being an operation acting on a target audio path control on the user interface of the live webcast channel.

A communication set corresponding to the live webcast channel contains a streamer identifier and an audience identifier. A streamer client corresponding to streamer identifier is configured to provide live video stream corresponding to the live webcast channel, and the audience client corresponding to the audience identifier is configured to play the live video stream.

In summary, the embodiments of the present disclosure provide a communication apparatus in a live webcast channel. By displaying audio path controls on a user interface of a live webcast channel of an audience client, receiving a trigger operation acting on an audio path control, and requesting the server to establish the audio path to the audience client according to trigger operation, the problem of low communication efficiency when an audience communicates with other users by text information is solved. Since the audience may perform voice communication with other users in a same live webcast channel over an audio path between the audience client and a server, the communication efficiency of the audience in the live webcast channel is improved.

Figure 16:
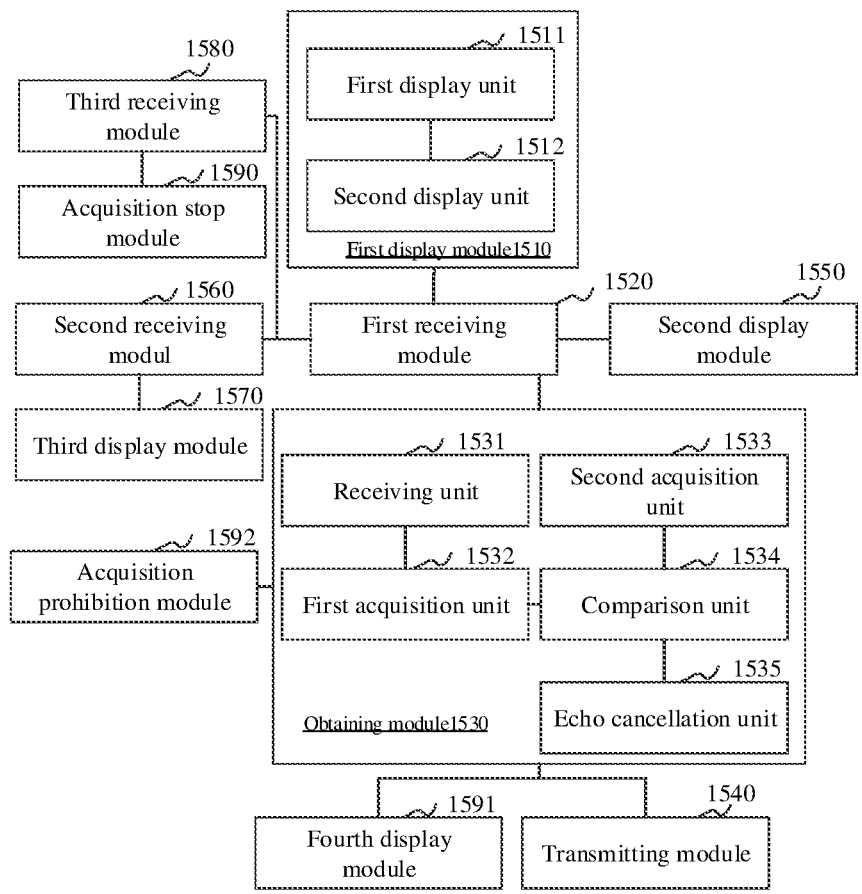
FIG. 16 is a block diagram of a communication apparatus in a live webcast channel in accordance with another embodiment of the present disclosure.

Based on the embodiment as illustrated in FIG. 15, referring to FIG. 16, a block diagram of a communication apparatus in a live webcast channel according to another example of the present disclosure is illustrated. The apparatus has functions of practicing the method embodiments. The functions may be implemented by hardware or by running corresponding software by hardware. The device may be applied to a terminal on which the audience client is installed. For example, the terminal may be the second terminal 120 in the system as illustrated in FIG. 1.

The apparatus further includes:

The first displaying module 1510, configured to display at least one audio path control on a user interface in a live webcast channel. The audio path control is configured to trigger the establishment of an audio path between an audience client and a server.

The first receiving module 1520, configured to receive a trigger operation acting on a target audio path control. The trigger operation is to request to establish an audio path corresponding to the target audio path control. The target audio path control is one of the at least one audio path control;

The acquiring module is configured to acquire the first audio information when the user interface is displayed after the audio path is successfully established.

The first displaying module 1510 includes a first displaying unit 1511 and a second displaying unit 1512.

The first displaying unit 1511 is configured to display, on the user interface of the live webcast channel, a first audio path control in a first display mode, a first audio path corresponding to the first audio path control being in an establishment prohibited state; and display a second audio path control in a second display mode, a second audio path corresponding to the first audio path control being in an establishment permitted state.

The second displaying unit 1512 is configured to not display, on the user interface of the live webcast channel, the first audio path control, and display the second audio path control in the second display mode.

The first display mode is different from the second display mode.

In some embodiments, the apparatus further includes a second displaying module 1550.

The second displaying module 1550 is configured to display, on the user interface of the live webcast channel, a target audio path control in a third display mode. The third display mode is to indicate that an audio path corresponding to the target audio path control is occupied.

In some embodiments, the apparatus further includes: a second receiving module 1560 and a third displaying module 1570.

The second receiving module 1560 is configured to receive a disconnect operation. The disconnect operation is to disconnect the audio path corresponding to the target audio path control.

The third displaying module 1570 is configured to display the target audio path control in a second display mode. The second display mode is to indicate that the audio path corresponding to the target audio path control is in an establishment permitted state.

In some embodiments, the acquiring module 1530 includes a receiving unit 1531 and a first capturing unit 1532.

The receiving unit 1531 is configured to receive an audio capture operation.

The first capturing unit 1532 is configured to start to acquire the first audio information according to the audio capture operation.

In some embodiments, the apparatus further includes a third receiving module 1580 and a capture stopping module 1590.

The third receiving module 1580 is configured to receive a capture stop operation.

The capture stopping module 1590 is configured to stop capturing the first audio information according to the capture stop operation.

In some embodiments, the apparatus further includes a fourth displaying module 1591.

The fourth displaying module 1591 is configured to display, on the user interface of the live webcast channel, a fourth audio path control in a fourth display mode. The fourth display mode is to indicate that audio information is being transmitted on an audio path corresponding to the fourth audio path control. The fourth audio path control is an audio path control in the at least one audio path control.

In some embodiments, the acquiring module 1530 includes a capturing unit 1533, a comparing unit 1534 and an echo canceling unit 1535.

The capturing unit 1533 is configured to capture an audio signal according to the received audio capture operation after the audio path is successfully established.

The comparison unit 1534 is configured to compare the audio signal with second audio information transmitted by the server, wherein the second audio information is audio information received from the server and played in real time by the audience client.

The echo canceling unit 1535 is configured to remove, by an echo cancellation algorithm, information the same as the second audio information from the audio signal to obtain the first audio information.

In some embodiments, the apparatus further includes a capture prohibiting module 1592.

The capture prohibition module 1592 is configured to prohibit the audience client from capturing the live video stream from the server when the audience client runs in the back-end.

The related details may refer to the method embodiments as illustrated in FIGS. 2, 7 and 9.

Figure 17:
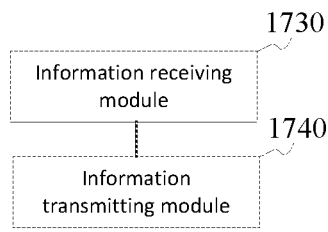
FIG. 17 is a block diagram of a communication apparatus in a live webcast channel in accordance with an embodiment of the present disclosure.

Referring to FIG. 17, a block diagram of a communication apparatus in a live webcast channel according to an embodiment of the present disclosure is illustrated. The apparatus has functions of practicing the method embodiments. The functions may be implemented by hardware or by running corresponding software by hardware. The apparatus may be applied in a server. For example, the server may be the server 130 in the system as illustrated in FIG. 1. The apparatus may include: an information receiving module 1730 and an information transmitting module 1740.

The information receiving module 1730 is configured to receive first audio information transmitted by the audience client over the audio path to the audience client, wherein the audio path is established by a request to the server according to a trigger operation, and the trigger operation is an operation acting on a target audio path control on the user interface of the live webcast channel.

The information transmitting module 1740 is configured to distribute the first audio information to at least one other client pertaining to the live webcast channel, wherein the at least one other client is the streamer client, or the at least one other client is a client other than the audience client that transmits the first audio information.

A communication set corresponding to the live webcast channel contains a streamer identifier and an audience identifier. A streamer client corresponding to streamer identifier is configured to provide live video stream corresponding to the live webcast channel, and the audience client corresponding to the audience identifier is configured to play the live video stream.

In summary, in the communication apparatus in a live webcast channel provided in this example, by displaying audio path controls on a user interface of a live webcast channel of an audience client; receiving a trigger operation acting on an audio path control; requesting the server to establish the audio path to the audience client according to trigger operation, the problem of low communication efficiency when an audience communicates with other users by text information is solved. Since the audience may perform voice communication with other users in a same live webcast channel over an audio path between the audience client and a server, the communication efficiency of the audience in the live webcast channel is improved.

Figure 18:
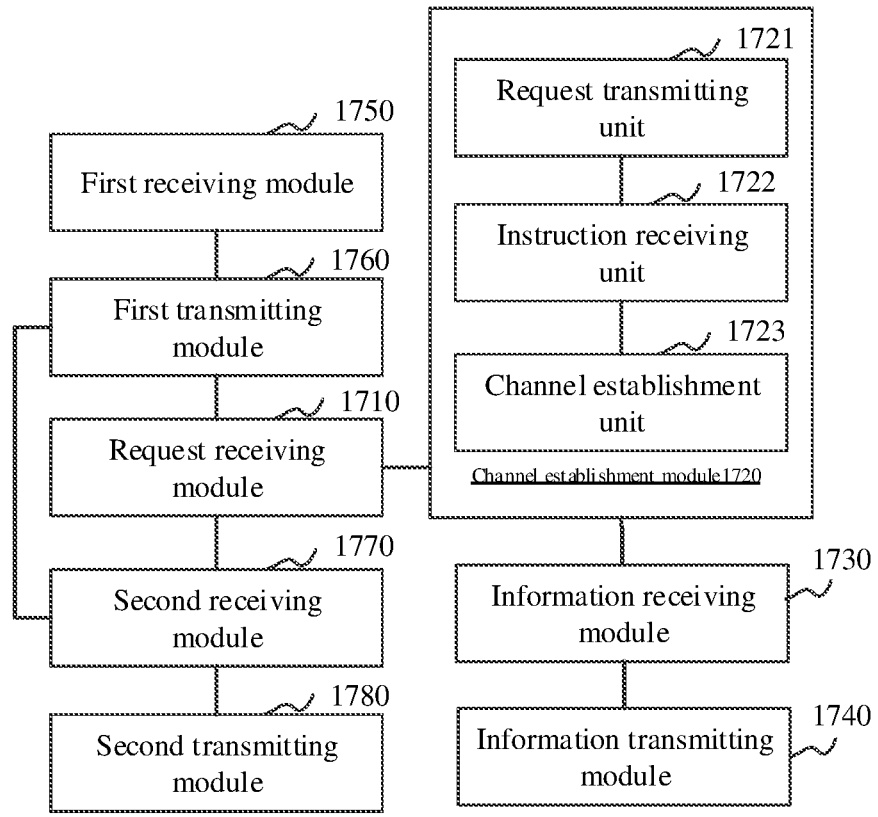
FIG. 18 is a block diagram of a communication apparatus in a live webcast channel in accordance with another embodiment of the present disclosure.

In some embodiments, based on the embodiment as illustrated in FIG. 17, referring to FIG. 18, a block diagram of a communication apparatus in a live webcast channel in accordance with another example of the present disclosure is illustrated. The apparatus has functions of practicing the method embodiments. The functions may be implemented by hardware or by running corresponding software by hardware. The apparatus may be applied in a server. For example, the server may be the server 130 in the system as illustrated in FIG. 1.

The apparatus further includes: a request receiving module 1710 is configured to receive a path establishment request transmitted by an audience client. The path establishment request is generated by the audience client when receiving a trigger operation acting on a target audio path control. The target audio path control is one of at least one audio path controls displayed on a user interface of a live webcast channel.

The channel establishment module 1720 is configured to establish an audio path to the audience client according to the path establishment request.

The path establishment request at least includes a path identifier corresponding to the target audio path control, a live webcast channel identifier corresponding to the live webcast channel and an audience identifier corresponding to the audience client.

The channel establishment module 1720 includes a request transmitting unit 1721, an instruction receiving unit 1722 and a channel establishing unit 1723.

The request transmitting unit 1721 is configured to transmit the path establishment request to a management client pertaining to the live webcast channel corresponding to the live webcast channel identifier.

The instruction receiving module 1722 is configured to receive the path establishment instruction transmitted by the management client, the path establishment instruction is t is an instruction, sent by the management client, that the establishment of the audio path corresponding to the path establishment instruction is permitted.

The channel establishing unit 1723 is configured to establish an audio path to the audience client according to the path establishment instruction.

In some embodiments, the apparatus further includes a first receiving module 1750 and a first transmitting module 1760.

The first receiving module 1750 is configured to receive a channel disabled state notification. The channel disabled state notification includes a path identifier of at least one audio path and a live webcast channel identifier. The channel disabled state notification is to notify the server that a first audio path corresponding to the path identifier in the live webcast channel corresponding to the live webcast channel identifier is in an establishment prohibited state.

The first transmitting module 1760 is configured to transmit the channel disabled state notification to the audience client.

In some embodiments, the apparatus further includes a second receiving module 1770 and a second transmitting module 1780.

The second receiving module 1770 is configured to receive a disabled state release notification. The disabled state release notification includes the path identifier of the first audio path and the live webcast channel identifier. The disabled state release notification is to notify the server that the first audio path in the live webcast channel corresponding to the live webcast channel identifier is in an establishment permitted state.

The second transmitting module 1780 is configured to transmit the disabled state release notification to the audience client.

The related details may be referred to the method embodiments as illustrated in FIGS. 2, 7 and 9.

Referring to FIG. 9, a block diagram of a communication apparatus in a live webcast channel according to an embodiment of the present disclosure is illustrated. The apparatus has functions of practicing the method embodiments. The functions may be implemented by hardware or by running corresponding software by hardware. The apparatus may be applied to a terminal on which the audience client is installed. For example, the terminal may be the second terminal 120 in the system as illustrated in FIG. 1. The apparatus may include an information receiving module 1930 and a play model 1931.

The request displaying module 1910 is configured to display, on a user interface of a live webcast channel, a path establishment request transmitted by a server. The path establishment request includes an audience identifier pertaining to the live webcast channel, and the path establishment request is to request to establish an audio path between an audience client corresponding to the audience identifier and the server.

The instruction transmitting module 1920 is configured to transmit a path establishment instruction to the server according to the path establishment request. The path establishment instruction is to instruct the server to establish the audio path according to the path establishment instruction. The audio path is a path for transmitting, by an audience client corresponding to the audience identifier, first audio information to the server; the server is configured to distribute the first audio information to at least one other client pertaining to the live webcast channel; the at least one other client is the streamer client, or the at least one other client is a client other than the audience client that transmits the first audio information.

The live webcast channel includes a streamer identifier and an audience identifier, wherein the streamer client corresponding to streamer identifier is configured to provide a live video stream, and the audience client corresponding to the audience identifier is configured to play the live video stream.

In some embodiments, the apparatus further includes:

the information receiving module 1930, configured to receive the first audio information, the first audio information is transmitted by the audience client to the server over the audio path. The first audio information is transmitted to the server by the audience client.

In summary, in the communication apparatus in a live webcast channel provided in this example, by displaying audio path controls on a user interface of a live webcast channel of an audience client; receiving a trigger operation acting on an audio path control; requesting the server to establish the audio path to the audience client according to trigger operation, the problem of low communication efficiency when an audience communicates with other users by text information is solved. Since the audience may perform voice communication with other users in a same live webcast channel over an audio path between the audience client and a server, the communication efficiency of the audience in the live webcast channel is improved.

Figure 19:
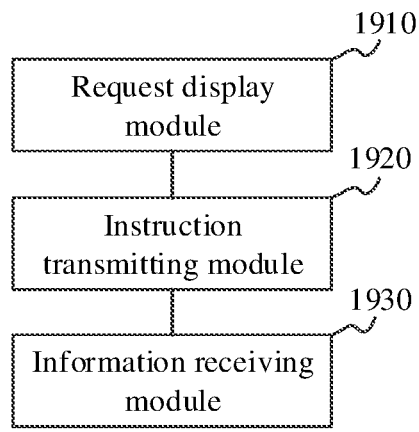
FIG. 19 is a block diagram of a communication apparatus in a live webcast channel in accordance with an embodiment of the present disclosure.
Figure 20:
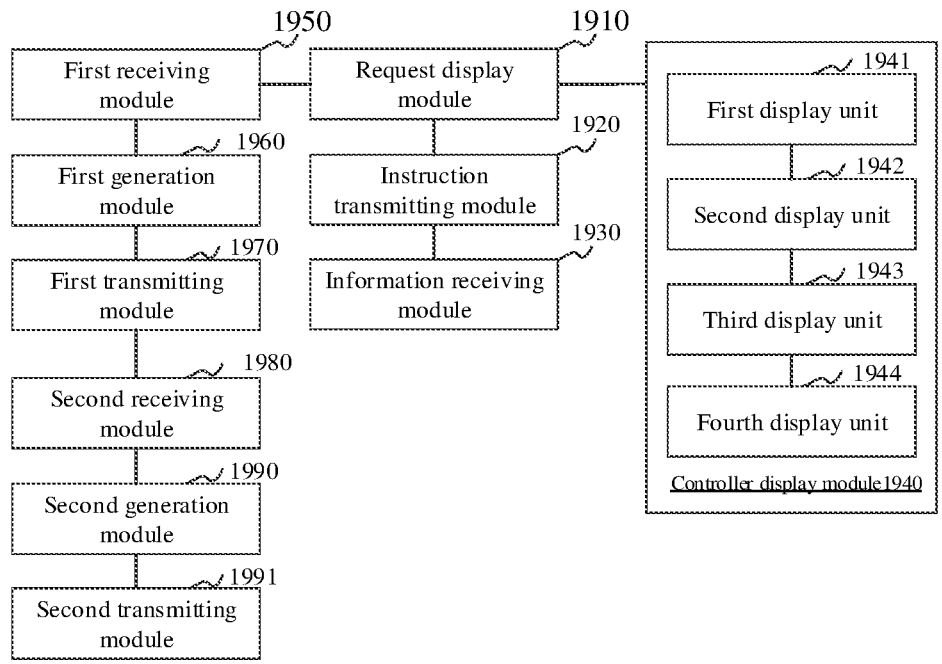
FIG. 20 is a block diagram of a communication apparatus in a live webcast channel in accordance with another embodiment of the present disclosure.

Based on the embodiment as illustrated in FIG. 19, referring to FIG. 20, a block diagram of a communication apparatus in a live webcast channel according to another example of the present disclosure is illustrated. The apparatus has functions of practicing the method embodiments. The functions may be implemented by hardware or by running corresponding software by hardware. The apparatus may be applied to a terminal on which the audience client is installed. For example, the terminal may be the second terminal 120 in the system as illustrated in FIG. 1.

In some embodiments, the apparatus further includes a control displaying module 1940.

The control displaying module 1940 is configured to display at least one audio path control on a user interface of a live webcast channel. The audio path control is configured to trigger the establishment of an audio path between a manage client and a server.

In some embodiments, the displaying module 1940 includes a first displaying unit 1941, a second displaying unit 1942, a third displaying unit 1943 and a fourth displaying unit 1944.

The first displaying unit 1941 is configured to display, on the user interface of the live webcast channel, a first audio path control in a first display mode; or not display the first audio path control on the user interface of the live webcast channel. An audio path corresponding to the first audio path control is in an establishment prohibited state.

The second displaying unit 1942 is configured to display, on the user interface of the live webcast channel, a second audio path control in a second display mode. An audio path corresponding to the second audio path control is in an establishment permitted state.

The third displaying unit 1943 is configured to display, on the user interface of the live webcast channel, a third audio path control in a third display mode. The third display mode is to indicate that an audio path corresponding to the third audio path control is occupied.

The fourth displaying unit 1944 is configured to display, on the user interface of the live webcast channel, a fourth audio path control in a fourth display mode. The fourth display mode is to indicate that audio information is being transmitted over an audio path corresponding to the fourth audio path control.

In some embodiments, the apparatus further includes a first receiving module 1950, a first generating module 1960 and a first transmitting module 1970.

The first receiving module 1950 is configured to receive a first channel setting operation.

The first generating module 1960 is configured to generate a channel disabled state notification according to a path identifier corresponding to the first audio path indicated by the first channel setting operation and a live webcast channel identifier corresponding to the live webcast channel.

The first transmitting module 1970 is configured to transmit the channel disabled state notification to a server. The server determines, according to the channel disabled state notification, the first audio path in the live webcast channel to be in an establishment prohibited state.

In some embodiments, the apparatus further includes a second receiving module 1980, a second generating module 1990 and a second transmitting module 1991.

The second receiving module 1980 is configured to receive a second channel setting operation.

The second generating module 1990 is configured to generate a disabled state release notification according to the path identifier corresponding to the first audio path indicated by the second channel setting operation and the live webcast channel identifier corresponding to the live webcast channel.

The second transmitting module 1991 is configured to transmit the disabled state release notification to the server. The server determines, according to the disabled state release notification, the first audio path in the live webcast channel to be in an establishment permitted state.

The related details may be referred to the method embodiments as illustrated in FIGS. 2, 7 and 9.

It is to be noted that, when the apparatuses according to above embodiments achieve their functions, the division of the functional modules described above is merely illustrative. In practical applications, the function allocation may be completed by different functional modules as required, that is, the internal structures of the apparatuses are divided into different functional modules to implement all or some of the functions described above. Additionally, the apparatuses according to above embodiments are based on the same inventive concept as the method embodiments, and the specific implementations of the apparatuses are detailed in the method embodiments and will not be repeated here.

Figure 21:
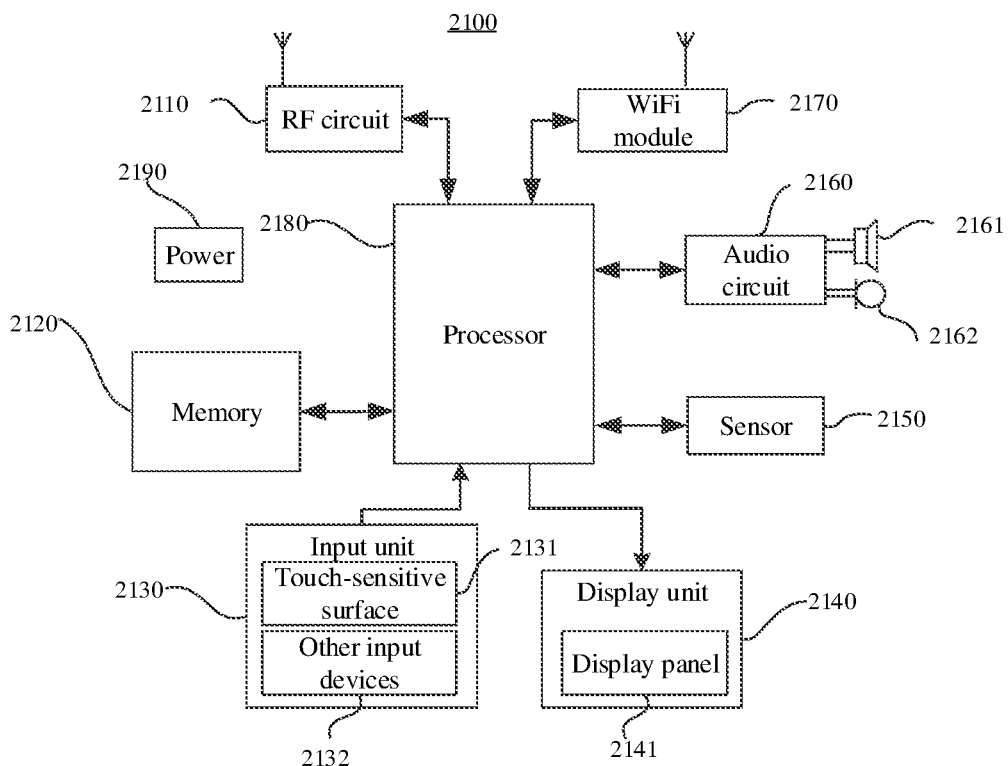
FIG. 21 is a schematic structural diagram of a terminal in accordance with an embodiment of the present disclosure.

Referring to FIG. 21, a schematic structural diagram of a terminal according to an embodiment of the present disclosure is illustrated. The terminal 2100 is configured to implement the communication methods in a live webcast channel according to the above embodiments.

The terminal 2100 may include a radio frequency (RF) circuit 2110, a memory 2120 including one or more computer-readable storage media, an input unit 2130, a displaying unit 2140, a sensor 2150, an audio circuit 2160, a wireless fidelity (WiFi) module 2170, a processor 2180 including one or more processing cores, a power supply 2190 or the like. It should be understood by those skilled in the art that the terminal structure as illustrated in FIG. 21 does not constitute any limitations to the terminal, and the terminal may include more or fewer components over those illustrated in FIG. 21, or a combination of some of the components, or different component arrangements.

The RF circuit 2110 may be configured to receive or transmit information, or receive or transmit signals during a call. Particularly, the RF circuit 2110 receives downlink information from a base station and then transmits the downlink information to one or more processors 2180 for processing. Additionally, the RF circuit 2110 transmits data involved in the uplink to the base station. Generally, the RF circuit 2110 includes, but not limited to, an antenna, at least one amplifier, a tuner, one or more oscillators, a subscriber identify module (SIM) card, a transceiver, a coupler, a low noise amplifier (LNA), a duplexer or the like. Additionally, the RF circuit 2110 may also communicate with networks and other devices by wireless communication. The wireless communication may use any communication standard or protocol, including but not limited to, global system of mobile communication (GSM), general packet radio service (GPRS), code division multiple access (CDMA), wideband code division multiple access (WCDMA), long term evolution (LTE), E-mail, short messaging service (SMS) or the like.

The memory 2120 may be configured to store software programs and modules.

The processor 2180 executes various functional applications and data processing by running the software programs and modules stored in the memory 2120. The memory 2120 may mainly include a program storage region and a data storage region, wherein the program storage region may store operating systems, applications required for at least one function (e.g., a sound playback function, an image playback function or the like), or the like; and the data storage region may store data (e.g., audio data, phone books or the like) created according to the use of the terminal 2100, or the like. Additionally, the memory 2120 may include a high-speed random access memory, and may also include a non-volatile memory, for example, at least one magnetic disk storage device, a flash storage device, or other volatile solid-state storage devices. Correspondingly, the memory 2120 may also include a memory to provide the access to the memory 2120 by the processor 2180 and the input unit 2130.

The input unit 2130 may be configured to receive the input digital or character information, and generate keyboard, mouse, operating lever, optical or trackball signal inputs related to the user settings and functional s. Specifically, the input unit 2130 may include an image input device 2131 and other input devices 2132. The image input device 2131 may be a camera, or may be a photoelectric scanning device. In addition to the image input device 2131, the input unit may further include other input devices 2132. Specifically, the other input devices 2132 may include, but not limited to, one or more of a physical key, a functional key (e.g., a volume control key, a switch key or the like), a trackball, a mouse, an operating lever and the like.

The displaying unit 2140 may be configured to display information input by a user or provided to the user and various graphical user interfaces of the terminal 2100. These graphic user interfaces may be composed of graphs, text, icons, video and any combination thereof. The displaying unit 2140 may include a display panel 2141. In some embodiments, the display panel 2141 may be configured in form of a liquid crystal display (LCD), an organic light-emitting diode (OLED) or the like.

The terminal 2100 may further include at least one sensor 2150, for example, a light sensor, a motion sensor and other sensors. Specifically, the light sensor may include an ambient light sensor and a proximity sensor. The ambient light sensor may adjust the luminance of the display panel 2141 according to the luminance of the ambient light, and the proximity sensor may turn off the display panel 2141 and/or backlight when the terminal 2100 is moved to the ear. As a type of the motion sensor, the gravity acceleration sensor may detect the magnitude of acceleration in all directions (generally three axes), may detect the magnitude and direction of the gravity when it is static, and may be configured to identify applications of mobile phone postures (e.g., switchover between horizontal and vertical screens, related games, magnetometer posture calibration), vibration identification related functions (e.g., a pedometer or a tap) or the like. Other sensors such as a gyroscope, a barometer, a hygrometer, a thermometer or an infrared sensor that may be configured in the terminal 2100 will not be described here.

The audio circuit 2160, a loudspeaker 2161 and a microphone 2162 may provide an audio interface between the user and the terminal 2100. The audio circuit 2160 may convert the received audio data into an electrical signal and transmit the electrical signal to the loudspeaker 2161, and the electrical signal is converted, by the loudspeaker 2161, into a sound signal for output. On the other hand, the microphone 2161 converts the acquired sound signal into an electrical signal which is received by the audio circuit 2160 and then converted into audio data. The audio data is then output to the processor 2180 for processing and then transmitted to, for example, another terminal via the RF circuit 2110, or the audio data is output to the memory 2120 for further processing. The audio circuit 2160 may further include an earplug jack to provide communication between a peripheral earphone and the terminal 2100.

WiFi is a short-distance wireless transmission technology. The terminal 2100 may help a user to receive or transmit e-mails, browse web pages and access streaming media or the like via the WiFi module 2170. It provides the user with wireless broadband Internet access. Although the WiFi module 2170 is illustrated in FIG. 21, it should be understood that the WiFi module 2170 is not a necessary constituent of the terminal 2100 and may be completely omitted as needed without changing the scope of the essence of the present disclosure.

The processor 2180 is a control center of the terminal 2100, and is connected to various parts of the entire mobile phone by various interfaces and lines. By running or executing the software programs and/or modules stored in the memory 2120 and invoking the data stored in the memory 2120, the processor 2180 implements various functions and processes data, so as to achieve the overall monitoring of the mobile phone. In some embodiments, the processor 2180 may include one or more processing cores. Preferably, the processor 2180 may integrate an application processor and a modem processor, wherein the application processor mainly processes the operating systems, user interfaces, applications or the like, and the modem processor mainly processes the wireless communication. It should be understood that the modem processor may not be integrated into the processor 2180.

The terminal 2100 further includes a power supply 2190 (e.g., a battery) for supplying power to each component. Preferably, the power supply may be logically connected to the processor 2180 by a power management system, such that the functions of managing charging, discharging, power consumption or the like are implemented by the power management system. The power supply 2190 may further include one or more DC or AC power supplies, a recharging system, a power failure detection circuit, a power converter or inverter, a power status indicator or any other components.

Although not shown, the terminal 2100 may further include a Bluetooth module or the like, which will not be described in detail here.

Specifically, in this example, the terminal 2100 further includes a memory and one or more programs. The one or more programs are stored in the memory and configured to be executed by one or more processors. The one or more programs contain instructions for performing the methods described above.

Figure 22:
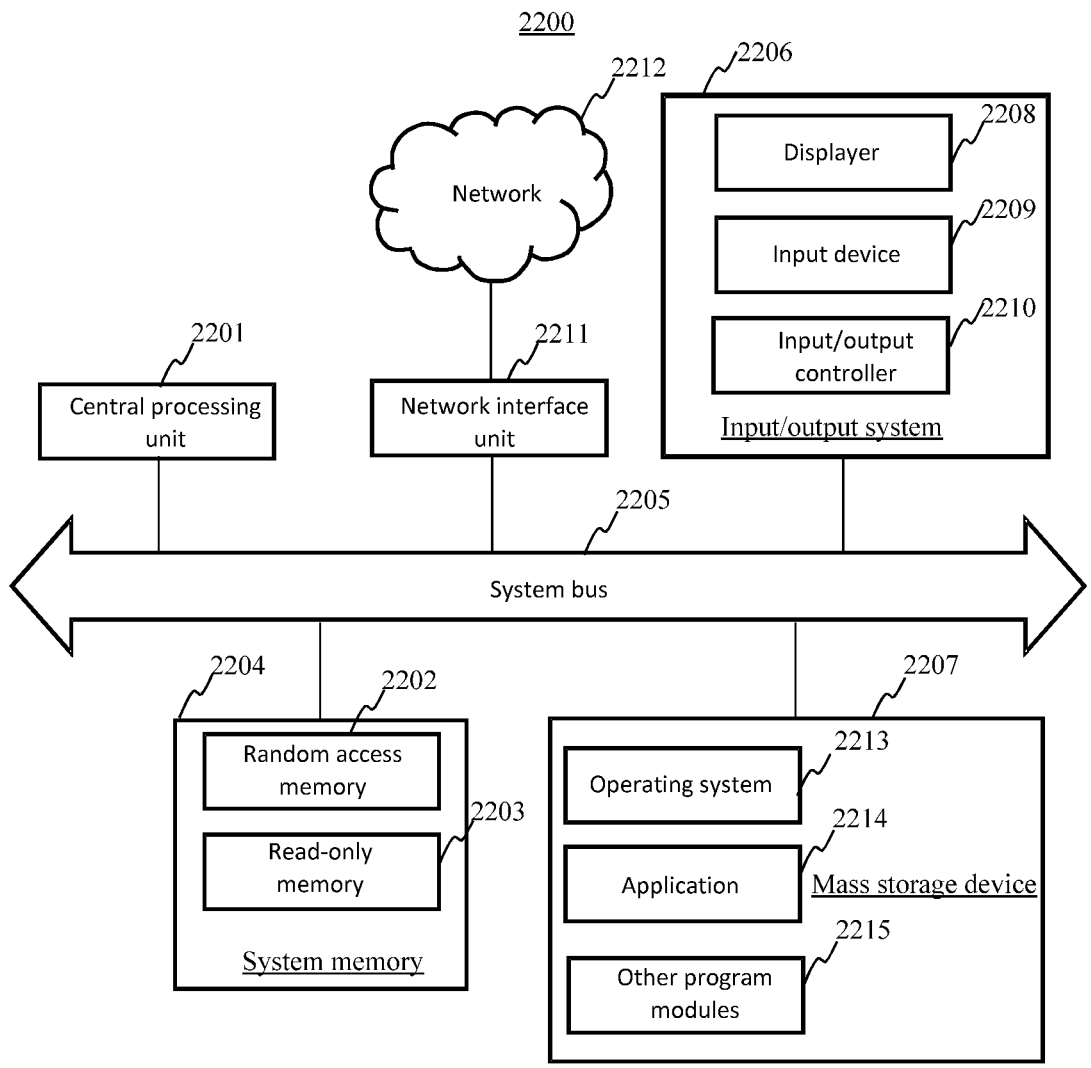
FIG. 22 is a schematic structural diagram of a server in accordance with an embodiment of the present disclosure.

FIG. 22 is a schematic structural diagram of a server according to an embodiment of the present disclosure. The server 2200 includes a central processing unit (CPU) 2201, a system memory 2204, including a random access memory (RAM) 2202 and a read-only memory (ROM) 2203, and a system bus 2205 for connecting the system memory 2204 and the CPU 2201. The server 220 further includes a basic input/output (I/O) system 2206 for assisting in information transmission among various devices in a computer, and a mass storage device 2207 for storing operating systems 2213, applications 2214 and other program modules 2215.

The basic input/output system 2206 includes a display 2208 for displaying information and an input device 2209, such as a mouse or a keyboard or keypad, for inputting information by a user. Both the display 2208 and the input device 2209 are connected to the CPU 2201 via an input/output 2210 that is connected to the system bus 2205. The basic input/output system 2206 may further include the input/output 2210 for receiving and processing the inputs from a plurality of other devices such as a keyboard or keypad, a mouse or an electronic stylus. Similarly, the input/output 2210 also provides outputs to a display screen, a printer or other types of output devices.

The mass storage device 2207 is connected to the CPU 2202 via a mass storage (not illustrated) that is connected to the system bus 2205. The mass storage device 2207 and the associated computer-readable medium provide the non-volatile storage for the server 2200. In other words, the mass storage device 2207 may include a computer-readable medium (not illustrated), such as a hard disk or a compact disc read-only memory (CD-ROM) driver.

Without loss of generality, the computer-readable medium may include a computer storage medium and a communication medium. The computer storage medium includes a volatile and non-volatile, removable or non-removable medium implemented by any method or technology for storing information such as computer-readable instructions, data structures, program modules or other data. The computer storage medium include a RAM, a ROM, an erasable programmable read-only memory (EPROM), an electrically erasable programmable read-only memory (EEPROM), a flash or other solid-state storages and technologies thereof, a CD-ROM, a digital versatile disc (DVD), or other optical storage, cassette, magnetic tape, magnetic disc storage or other magnetic storage devices. Nevertheless, those skilled in the art would appreciate that the computer storage medium is not limited thereto. The system memory 2204 and the mass storage device 2207 may be collectively referred to as a memory.

According to various embodiments of the present disclosure, the server 2200 may also be connected, over a network such as the Internet, to a remote computer on the network for running. That is, the server 2200 may be connected to the network 2212 via a network interface unit 2211 that is connected to the system bus 2205, or may be connected to other types of networks or remote computer systems (not illustrated) via the network interface unit 2211.

An embodiment of the present disclosure further provides a computer-readable storage medium. The computer-readable storage medium may be a computer-readable storage medium stored in the memory in the above embodiments, or may be a computer-readable storage medium that exists separately and is not installed in the terminal. The computer-readable storage medium stores one or more programs that are used by one or more processors to perform the methods described above.

It should be understood that the "a plurality of" mentioned herein refers to two or more. The term "and/or" describes an association relationship between associated objects, and indicates that there may be three relationships. For example. A and/or B may indicate the following three situations: there exists an A alone; there exist A and B; and, there exists B alone. The character "/" generally indicates that there is an "or" relationship between previous and next associated objects.

It should be understood by a person of ordinary skill in the art that all or some of the steps for implementing the above embodiments may be completed by hardware or by instructing related hardware by programs. The programs may be stored in a computer-readable storage medium, which may be a read-only memory, a magnetic disc, a compact disk or the like.

The technical solutions according to the embodiments of the present disclosure achieve the following beneficial effects:

by displaying audio path controls on a user interface of a live webcast channel of an audience client; receiving a trigger operating acting on an audio path control; generating a path establishment request according to the trigger operation and transmitting the path establishment request to a server, and establishing, by the server, an audio path to the audience client according to the path establishment request, the problem of low communication efficiency when an audience communicates with other users by text information is solved. Since the audience may perform voice communication with other users in the same live webcast channel over an audio path between the audience client and a server, the communication efficiency of the audience in the live webcast channel is improved.

Described above are only exemplary embodiments of the present disclosure, and are not intended to limit the present disclosure. Within the spirit and principles of the present disclosure, any modifications, equivalent substitutions and improvements are within the protection scope of the present disclosure.

What is claimed is:

1. A communication method in a live webcast channel, the live webcast channel comprising a streamer identifier and an audience identifier, wherein a streamer client corresponding to streamer identifier is configured to provide a live video stream corresponding to the live webcast channel, and an audience client corresponding to the audience identifier is configured to play the live video stream; the method comprising:
displaying at least one audio path control in a user interface of a live webcast channel, wherein the at least one audio path control is configured to trigger an establishment of an audio path between an audience client and a server;
receiving a trigger operation acting on a target audio path control, wherein the trigger operation is sent from an audience and configured to request to establish the audio path corresponding to the target audio path control, and the target audio path control is one of the at least one audio path control;
acquiring first audio information of the audience by the audience client after the audio path is successfully established;
transmitting the first audio information of the audience to a server over the audio path;
receiving first channel setting operation by the management client;
generating, by the management client, a channel disabled state notification according to the first audio path indicated by the first channel setting operation;
transmitting the channel disabled state notification to the server by the management client;
receiving the channel disabled state notification by the server;
transmitting the channel disabled state notification to the audience client by the server;
receiving, by the audience client, the channel disabled state notification transmitted by the server; and
displaying a first audio path control in a first display mode and a second audio path control in a second display mode by the audience client, or only displaying the second audio path control in the second audio path control by the audience client,
wherein the first display mode indicates that the audio path corresponding to the first audio path control is in an establishment prohibited state, and the second display mode indicate, that the audio path corresponding to the second audio path control is in an establishment permitted state.

2. The method according to claim 1, wherein acquiring first audio information by the audience client after the audio path is successfully established comprises:
capturing an audio signal according to a received audio capture operation;
comparing the audio signal with second audio information transmitted by the server, the second audio information being audio information received from the server and played in real-time by the audience client; and
removing, by an echo cancellation algorithm, information the same as the second audio information from the audio signal to obtain the first audio information.

3. The method according to claim 1, wherein acquiring first audio information by the audience client after the audio path is successfully established comprises:
receiving an audio capture operation;
capturing the first audio information based on the audio capture operation.

4. The method according to claim 1, the method comprising:
receiving e first audio information over an audio path to the audience client;
distributing the first audio information to at least one other client pertaining to the live webcast channel, the at least one other client being the streamer client, or the at least one other client being a client other than the audience client that transmits the first audio information.

5. The method according to claim 4, wherein prior to the receiving the first audio information over the audio path to the audience client, the method further comprises:
receiving a path establishment request transmitted by the audience client, the path establishment request being generated by the audience client according to a received trigger operation acting on the target audio path control;
establishing the audio path to the audience client according to the path establishment request.

6. The method according to claim 5, wherein the path establishment request at least comprises a path identifier corresponding to the target audio channel control, a live webcast channel identifier corresponding to the live webcast channel and an audience identifier corresponding to the audience client; and
the establishing the audio path to the audience client according to the path establishment request comprises:
transmitting the path establishment request to a management client pertaining to the live webcast channel corresponding to the live webcast channel identifier, the management client being a client having a management authority in the live webcast channel;
receiving a path establishment instruction transmitted by the management client, the path establishment instruction being an instruction transmitted by the management client for establishing the audio path when the management client allows establishment of the audio path; and
establishing the audio path to the audience client according to the path establishment instruction.

7. The method according to claim 1, wherein the method comprises:
displaying, by a management client on the user interface of the live webcast channel, a path establishment request transmitted by the server, the path establishment request comprising an audience identifier pertaining to the live webcast channel, and the path establishment request being to request to establish the audio path; and
transmitting a path establishment instruction to the server according to the path establishment request by the management client, the path establishment instruction being to instruct the server to establish the audio path, the audio path being a path for transmitting first audio information to the server by the audience client corresponding to the audience identifier, the server being configured to distribute the first audio information to at least one other client pertaining to the live webcast channel, the at least one other client being the streamer client, or the at least one other client being a client other than the audience client that transmits the first audio information.

8. A non-transitory computer-readable storage medium, the non-transitory computer-readable storage medium storing one or more instructions; wherein the one or more instructions, when being executed by a processor, cause the processor to perform the communication method in a live webcast channel as defined in claim 1.

9. The method according to claim 1, wherein the method comprises:
receiving a second channel set operation by the management client;
generating a disabled state release notification corresponding to the first audio path according to the indication of the second channel setting operation by the management client;
transmitting the disabled state release notification to the server by the management client;
receiving the disabled state release notification by the server;
transmitting the disabled state release notification to the audience client by the server;
receiving, by audience client, the disabled state release notification transmitted by the server; and
displaying both a first audio path control and a second audio path control in a second display mode by the audience client.

10. The method according to claim 9, wherein the second display mode indicates that the audio path corresponding to the second audio path control is in an establishment permitted state.

11. The method according to claim 1, wherein the method comprises:
distributing the path identifier in the path establishment request to all clients pertaining to the same live webcast channel by the server; and
displaying an audio path control corresponding to the path identifier in a third display mode by each client.

12. The method according to claim 11, wherein the third display mode comprises at least one of:
displaying in a preset color;
displaying in a preset size;
displaying an avatar icon corresponding to an audience identifier occupying the audio path; and
displaying in form of a preset picture.

* * * * *